(12) United States Patent
Henriksson et al.

(10) Patent No.: US 7,652,980 B2
(45) Date of Patent: Jan. 26, 2010

(54) ORTHOGONAL FREQUENCY DIVISION MULTIPLEXING SYNCHRONIZATION

(75) Inventors: Jukka Allan Henriksson, Espoo (FI); Miika Tupala, Turku (FI); Jussi Vesma, Turku (FI)

(73) Assignee: Nokia Corporation, Espoo (FI)

( * ) Notice: Subject to any disclaimer, the term of this patent is extended or adjusted under 35 U.S.C. 154(b) by 99 days.

(21) Appl. No.: 11/934,462

(22) Filed: Nov. 2, 2007

(65) Prior Publication Data

US 2009/0116374 A1  May 7, 2009

(51) Int. Cl.
 *H04J 11/00* (2006.01)
(52) U.S. Cl. .................. 370/208; 370/210; 370/330; 375/298
(58) Field of Classification Search ................ None
 See application file for complete search history.

(56) References Cited

U.S. PATENT DOCUMENTS

| | | | | |
|---|---|---|---|---|
| 5,596,582 | A * | 1/1997 | Sato et al. ................ | 370/203 |
| 5,867,478 | A * | 2/1999 | Baum et al. ............... | 370/203 |
| 6,128,276 | A * | 10/2000 | Agee ........................ | 370/208 |
| 6,850,481 | B2 * | 2/2005 | Wu et al. .................. | 370/208 |
| 7,027,464 | B1 * | 4/2006 | Nakahara et al. .......... | 370/203 |
| 7,099,270 | B2 * | 8/2006 | Yamaguchi ................ | 370/208 |
| 2002/0003774 | A1 * | 1/2002 | Wang et al. ............... | 370/208 |
| 2002/0118771 | A1 * | 8/2002 | Larsson .................... | 375/267 |
| 2003/0072254 | A1 * | 4/2003 | Ma et al. .................. | 370/208 |
| 2004/0141457 | A1 | 7/2004 | Seo et al. | |
| 2005/0265226 | A1 * | 12/2005 | Shen et al. ................ | 370/210 |
| 2007/0206686 | A1 * | 9/2007 | Vook et al. ............... | 375/260 |
| 2008/0219144 | A1 * | 9/2008 | Brehler et al. ............ | 370/203 |
| 2008/0225995 | A1 * | 9/2008 | Auranen et al. ........... | 375/344 |
| 2008/0225996 | A1 * | 9/2008 | Vare et al. ................ | 375/344 |
| 2009/0103651 | A1 * | 4/2009 | Lahtonen et al. .......... | 375/308 |
| 2009/0190039 | A1 * | 7/2009 | Yun et al. ................. | 348/724 |

FOREIGN PATENT DOCUMENTS

| | | |
|---|---|---|
| EP | 0971515 | 1/2000 |
| EP | 1424789 | 6/2004 |

OTHER PUBLICATIONS

Nogami H; Nagashima T: "A Frequency and Timing Period Acquisition Technique for OFDM Systems," IEICE Transactions on Communications Society, Tokyo, JP, vol. E79-B, No. 8, Aug. 8, 1996, pp. 1135-1146.
PCT/IB2008/002821, International Search Report dated Sep. 30, 2009.

* cited by examiner

*Primary Examiner*—Chi H Pham
*Assistant Examiner*—David Andreasen
(74) *Attorney, Agent, or Firm*—Banner & Witcoff Ltd

(57) ABSTRACT

Embodiments are directed to first and second OFDM pilot symbols. The first and second pilot symbols may have first and second sets, respectively, of allowed, forbidden, and active carrier frequencies. The second sets of carrier frequencies may be formed by frequency shifting the respective first sets by a predetermined frequency, such as the frequency difference between adjacent carriers. An embodiment is directed to frequency translating part of a first received pilot symbol by one carrier interval in a first direction, frequency translating part of a second received pilot symbol by one carrier interval in a second direction that is opposite from the first direction, and forming a correlation by multiplying the frequency translated parts of the first and second pilot symbols by complex conjugates of parts of the pilot symbols upon which frequency translation has not been performed, and summing the multiplication results.

23 Claims, 26 Drawing Sheets

| Pilot Symbol 1 coarse frequency and time synchronization, FFT, GI, and modulation fixed 1102 | Signaling Symbol 2 modulation parameters and other signaling data, FFT, GI, and modulation fixed 1104 | Signaling Symbol 3 channel esimtation and fine timing 1106 | Data Symbol 1 1108 | Data Symbol 2 1110 |

FIG. 11

| P1 symbol | P2 symbol | DATA SYMBOL | DATA SYMBOL | DATA SYMBOL | DATA SYMBOL | DATA SYMBOL | symbols

| P1 | P2-1 | P2-n | P2-n | DATA | packets

FIG. 14

ORTHOGONAL FREQUENCY DIVISION MULTIPLEXING SYNCHRONIZATION

FIELD OF THE INVENTION

Embodiments relate generally to communications networks. More specifically, embodiments relate to orthogonal frequency division multiplexing synchronization.

BACKGROUND OF THE INVENTION

Digital broadband broadcast networks enable end users to receive digital content including video, audio, data, and so forth. Using a mobile terminal, a user may receive digital content over a wireless digital broadcast network. Digital content can be transmitted in a cell within a network. A cell may represent a geographical area that may be covered by a transmitter in a communication network. A network may have multiple cells and cells may be adjacent to other cells.

A receiver device, such as a mobile terminal, may receive a program or service in a data or transport stream. The transport stream carries individual elements of the program or service such as the audio, video and data components of a program or service. Typically, the receiver device locates the different components of a particular program or service in a data stream through Program Specific Information (PSI) or Service Information (SI) embedded in the data stream. However, PSI or SI signaling may be insufficient in some wireless communications systems, such as Digital Video Broadcasting—Handheld (DVB-H) systems. Use of PSI or SI signaling in such systems may result in a sub-optimal end user experience as the PSI and SI tables carrying in PSI and SI information may have long repetition periods. In addition, PSI or SI signaling requires a large amount of bandwidth which is costly and also decreases efficiency of the system.

BRIEF SUMMARY OF THE INVENTION

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

Embodiments are directed to first and second OFDM pilot symbols. The first and second pilot symbols may have first and second sets, respectively, of allowed, forbidden, and active carrier frequencies. The second sets of carrier frequencies may be formed by frequency shifting the respective first sets by a predetermined frequency, such as the frequency difference between adjacent carriers. An embodiment is directed to frequency translating part of a first received pilot symbol by one carrier interval in a first direction, frequency translating part of a second received pilot symbol by one carrier interval in a second direction that is opposite from the first direction, and forming a correlation by multiplying the frequency translated parts of the first and second pilot symbols by complex conjugates of parts of the pilot symbols upon which frequency translation has not been performed, and summing the multiplication results.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 11 shows an example of a pilot/signaling symbol sequence in accordance with an aspect of the invention.

FIGS. 13 and 14 depict relationships between P1, P2, and DATA symbols in accordance with an aspect of the invention.

DETAILED DESCRIPTION OF THE INVENTION

Figure 1:
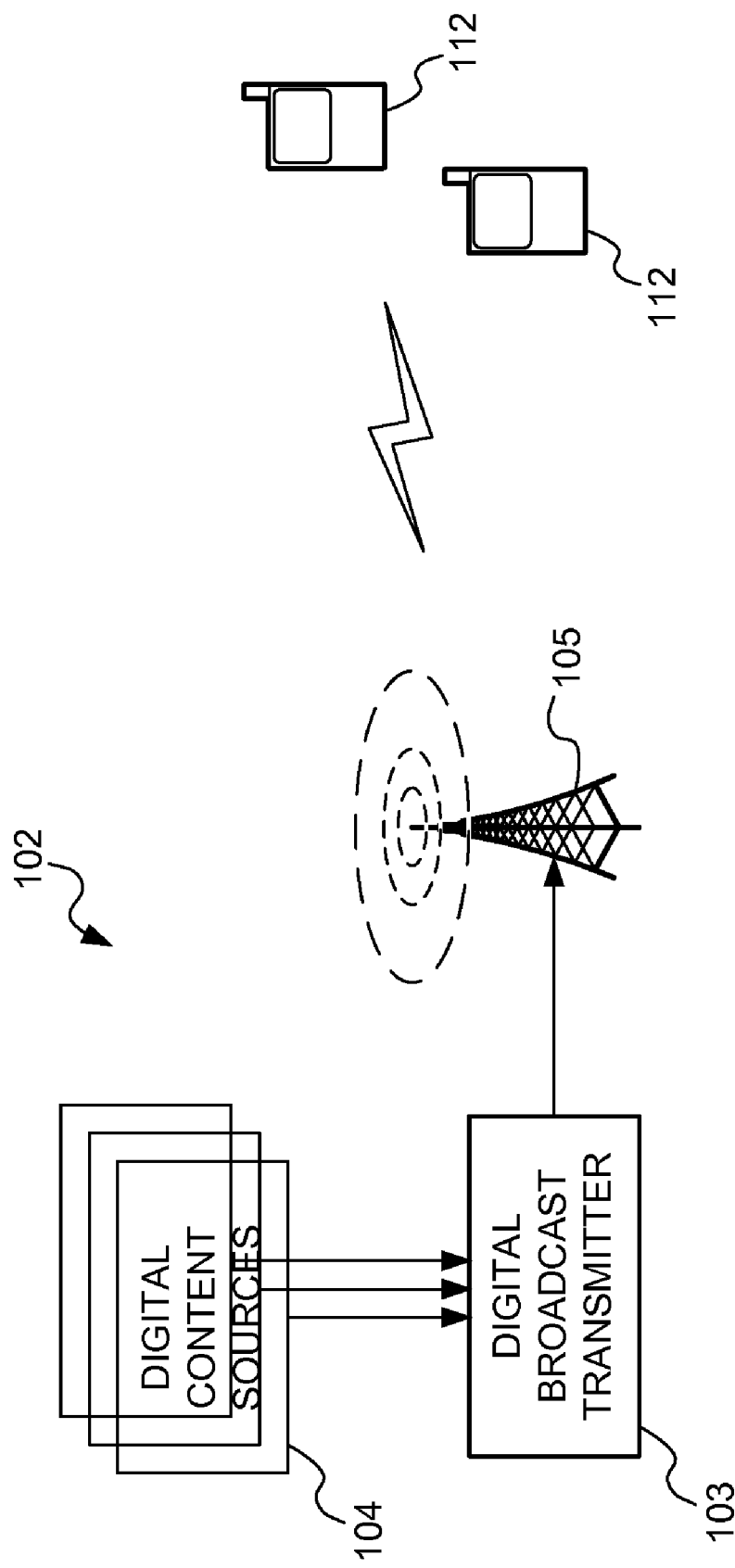
FIG. 1 illustrates a suitable digital broadband broadcast system in which one or more illustrative embodiments of the invention may be implemented.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Embodiments are directed to service discovery and channel search in digital broadcast networks. Relatively fast service discovery is desirable from a user's point of view. Naturally, the first time receiver device is used, a blind service discovery/channel search is performed. Also, when a terminal is switched off and moved to a different location, a new blind search is also performed. Usually, a mobile TV application also runs background channel search from time to time in order to detect possible new services. The blind service discovery should only take a couple of seconds so as not to irritate the end user and to enable frequent re-scans.

The challenges related to conventional digital video broadcast service discovery include the following. The DVB-H standard offers a lot of flexibility for the signal bandwidths, FFT sizes, Guard Intervals, Inner modulations and the like. Operators may use offsets for the DVB-H signal, i.e., the signal is not at the nominal center frequency of a channel, but is offset a certain amount. Different countries use different channel raster and signal bandwidth. TPS (Transmitter Parameter Signaling) is included in the standard to help receiver synchronization and channel search. Unfortunately, the receiver needs to know several parameters before it can decode TPS information. Signal bandwidth, frequency offset, FFT size, and Guard Interval need to be known before the TPS can be decoded. Most of the channels in the UHF band do not contain DVB-H service. The non-DVB-H channels are detected with a trial-and-error method (trying to achieve lock with all modes), and that consumes a lot of time. The time to detect non-DVB-H services actually mainly sets the achievable speed for channel search because usually most of the channels are empty or contain non-DVB-H service.

An example calculation for the blind service discovery is as follows: number of channels in UHF 35, (Channels 21-55, 470-750 MHz); number of frequency offsets 7 (−3/6, −2/6, −1/6, 0, +1/6, +2/6, +3/6 MHz); number of signal bandwidths 3 (6 MHz, 7 MHz, 8 MHz. 5 MHz is separate case only for USA receivers); number of FFT sizes 3 (2K, 4K, 8K); number of Guard Intervals 4 (1/32, 1/16, 1/8 and 1/4); and average time to decode TPS for one mode 120 ms (2K 50 ms, 4K 100 ms, 8K 200 ms). The numbers are exemplary.

The resulting time for blind service discovery would be in this example: 35*7*3*3*4*120 ms=1058.4 seconds=17.64 minutes.

In accordance with embodiments, various methods may be used to reduce how long it takes to perform channel search/service discovery. The basic idea of the various methods is to introduce a part of a signal (e.g. initialization/synchronization symbol(s)), which has known characteristics and remains the same with different digital video broadcast operation modes. Therefore, the known part of the signal can be decoded without having to resort to trial and error methods. The known part of signal contains the parameters for the rest of the signal; therefore, the rest of the signal can be decoded without trial and error methods after the known part is decoded. The known part of the signal comprises a subset of available subcarriers and their modulation. The combination of the predefined subcarriers (subcarrier numbers) and their modulation is chosen so that the combination is unique for each offset-FFT size pair (or unique for the different FFT-sizes only) and which combination may be used for identifying the signal as a desired signal for the digital video broadcast. Also, the channels containing digital video broadcast services can be efficiently detected using the known part of the signal. If the fixed known part is not found from the examined signal, then the signal will be considered a non-digital-video-broadcast signal or an empty channel, and the receiver can promptly proceed to a next channel/frequency. In this way, detecting non-digital-video-broadcast and empty channels becomes relatively fast.

FIG. 1 illustrates a suitable digital broadband broadcast system 102 in which one or more illustrative embodiments may be implemented. Systems such as the one illustrated here may utilize a digital broadband broadcast technology, for example Digital Video Broadcast—Handheld (DVB-H) or next generation DVB-H networks. Examples of other digital broadcast standards which digital broadband broadcast system 102 may utilize include Digital Video Broadcast—Terrestrial (DVB-T), Integrated Services Digital Broadcasting—Terrestrial (ISDB-T), Advanced Television Systems Committee (ATSC) Data Broadcast Standard, Digital Multimedia Broadcast-Terrestrial (DMB-T), Terrestrial Digital Multimedia Broadcasting (T-DMB), Satellite Digital Multimedia Broadcasting (S-DMB), Forward Link Only (FLO), Digital Audio Broadcasting (DAB), and Digital Radio Mondiale (DRM). Other digital broadcasting standards and techniques, now known or later developed, may also be used. Aspects of the invention may also be applicable to other multicarrier digital broadcast systems such as, for example, T-DAB, T/S-DMB, ISDB-T, and ATSC, proprietary systems such as Qualcomm MediaFLO/FLO, and non-traditional systems such 3GPP MBMS (Multimedia Broadcast/Multicast Services) and 3GPP2 BCMCS (Broadcast/Multicast Service).

Digital content may be created and/or provided by digital content sources 104 and may include video signals, audio signals, data, and so forth. Digital content sources 104 may provide content to digital broadcast transmitter 103 in the form of digital packets, e.g., Internet Protocol (IP) packets. A group of related IP packets sharing a certain unique IP address or other source identifier is sometimes described as an IP stream. Digital broadcast transmitter 103 may receive, process, and forward for transmission multiple digital content data streams from multiple digital content sources 104. In various embodiments, the digital content data streams may be IP streams. The processed digital content may then be passed to digital broadcast tower 105 (or other physical transmission component) for wireless transmission. Ultimately, mobile terminals or devices 112 may selectively receive and consume digital content originating from digital content sources 104.

Figure 2:
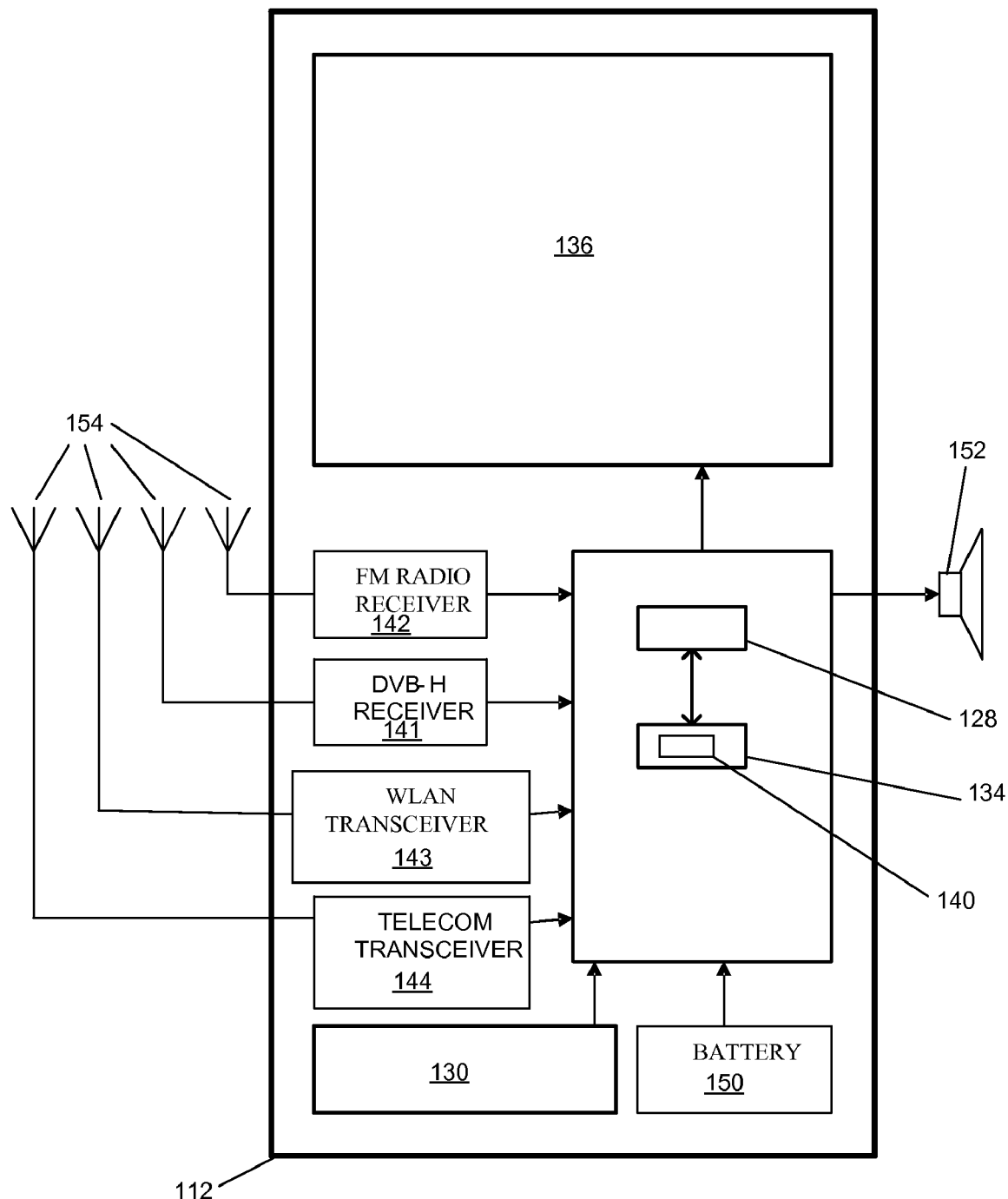
FIG. 2 illustrates an example of a mobile device in accordance with an aspect of the present invention.

As shown in FIG. 2, mobile device 112 may include processor 128 connected to user interface 130, memory 134 and/or other storage, and display 136, which may be used for displaying video content, service guide information, and the like to a mobile-device user. Mobile device 112 may also include battery 150, speaker 152 and antennas 154. User interface 130 may further include a keypad, touch screen, voice interface, one or more arrow keys, joy-stick, data glove, mouse, roller ball, touch screen, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process digital broadband broadcast transmissions that are based, for example, on the Digital Video Broadcast (DVB) standard, such as DVB-H or DVB-T, through a specific DVB receiver 141. The mobile device may also be provided with other types of receivers for digital broadband broadcast transmissions. Additionally, receiver device 112 may also be configured to receive, decode and process transmissions through FM/AM Radio receiver 142, WLAN transceiver 143, and telecommunications transceiver 144. In one aspect of the invention, mobile device 112 may receive radio data stream (RDS) messages.

In an example of the DVB standard, one DVB 10 Mbit/s transmission may have 200, 50 kbit/s audio program channels or 50, 200 kbit/s video (TV) program channels. The mobile device 112 may be configured to receive, decode, and process transmission based on the Digital Video Broadcast-Handheld (DVB-H) standard or other DVB standards, such as DVB-MHP, DVB-Satellite (DVB-S), or DVB-Terrestrial (DVB-T). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting—Terrestrial), DAB (Digital Audio Broadcasting), DMB (Digital Multimedia Broadcasting), FLO (Forward Link Only) or DIRECTV. Additionally, the digital transmission may be time sliced, such as in DVB-H technology. Time-slicing may reduce the average power consumption of a mobile terminal and may enable smooth and seamless handover. Time-slicing entails sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation.

In addition, an Electronic Service Guide (ESG) may be used to provide program or service related information. Generally, an Electronic Service Guide (ESG) enables a terminal to communicate what services are available to end users and how the services may be accessed. The ESG includes independently existing pieces of ESG fragments. Traditionally, ESG fragments include XML and/or binary documents, but more recently they have encompassed a vast array of items, such as for example, a SDP (Session Description Protocol) description, textual file, or an image. The ESG fragments describe one or several aspects of currently available (or future) service or broadcast program. Such aspects may include for example: free text description, schedule, geographical availability, price, purchase method, genre, and supplementary information such as preview images or clips. Audio, video and other types of data including the ESG fragments may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). Data is often transmitted through the Internet addressed to a single user. It can, however, be addressed to a group of users, commonly known as multicasting. In the case in which the data is addressed to all users it is called broadcasting.

One way of broadcasting data is to use an IP datacasting (IPDC) network. IPDC is a combination of digital broadcast and Internet Protocol. Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). One type of DVB is Digital Video Broadcasting-handheld (DVB-H). The DVB-H is designed to deliver 10 Mbps of data to a battery-powered terminal device.

DVB transport streams deliver compressed audio and video and data to a user via third party delivery networks. Moving Picture Expert Group (MPEG) is a technology by which encoded video, audio, and data within a single program is multiplexed, with other programs, into a transport stream (TS). The TS is a packetized data stream, with fixed length packets, including a header. The individual elements of a program, audio and video, are each carried within packets having an unique packet identification (PID). To enable a receiver device to locate the different elements of a particular program within the TS, Program Specific Information (PSI), which is embedded into the TS, is supplied. In addition, additional Service Information (SI), a set of tables adhering to the MPEG private section syntax, is incorporated into the TS. This enables a receiver device to correctly process the data contained within the TS.

As stated above, the ESG fragments may be transported by IPDC over a network, such as for example, DVB-H to destination devices. The DVB-H may include, for example, separate audio, video and data streams. The destination device must then again determine the ordering of the ESG fragments and assemble them into useful information.

In a typical communication system, a cell may define a geographical area that may be covered by a transmitter. The cell may be of any size and may have neighboring cells.

Figure 3:
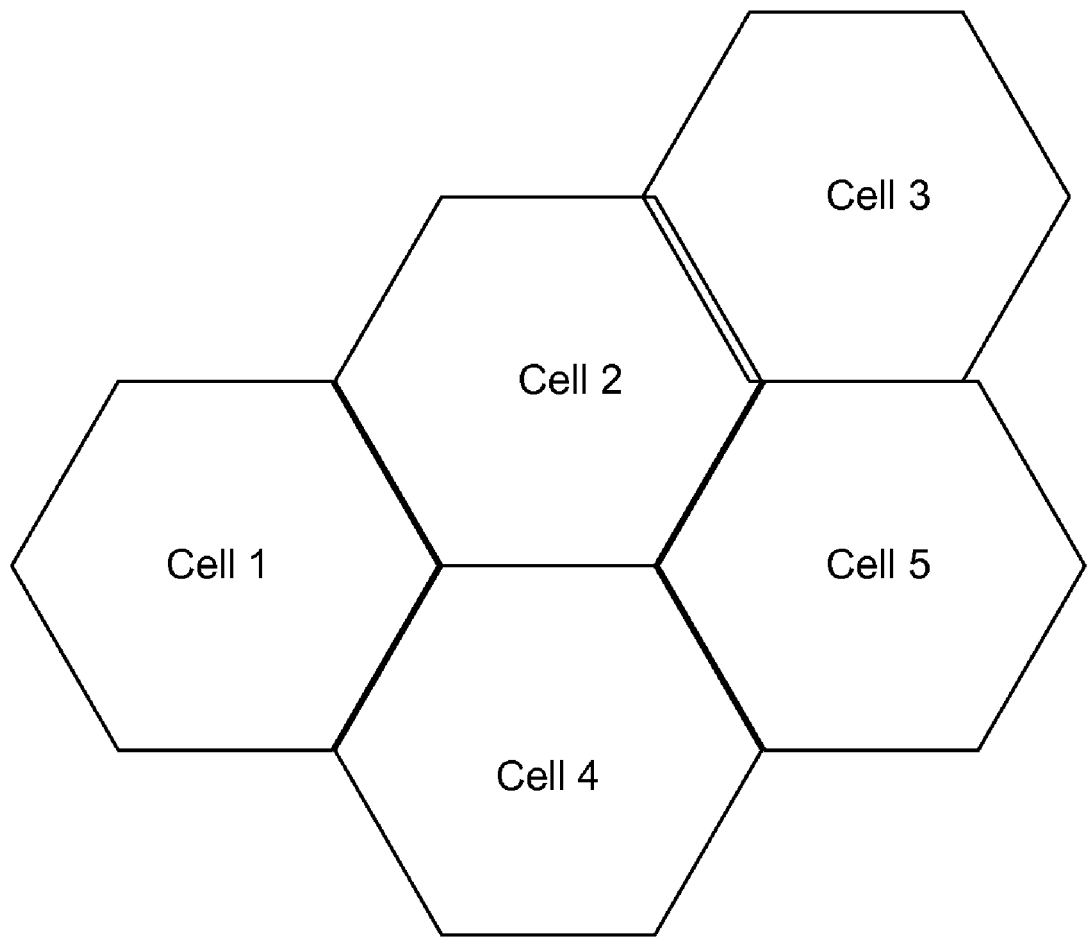
FIG. 3 illustrates an example of cells schematically, each of which may be covered by a different transmitter in accordance with an aspect of the present invention.

FIG. 3 illustrates schematically an example of cells, each of which may be covered by a different transmitter. In this example, Cell 1 represents a geographical area that is covered by a transmitter for a communication network. Cell 2 is next to Cell 1 and represents a second geographical area that may be covered by a different transmitter. Cell 2 may, for example, be a different cell within the same network as Cell 1. Alternatively, Cell 2 may be in a network different from that of Cell 1. Cells 1, 3, 4, and 5 are neighboring cells of Cell 2, in this example.

In accordance with one or more embodiments, data used in channel searches and service discovery is signaled using symbols at least in the beginning of a data frame carrying multimedia and other data for services. In other embodiments, one or more of these symbols may also be inserted within the data frames. Further, one or more of these symbols may be inserted at the beginning of, and/or within, a superframe composed of two or more data frames.

In one embodiment, the symbols comprise a first symbol that can be used for identifying that the signal is of the desired type. Further, the first symbol may be used for detecting an offset from the radio channel center frequency. The symbols may comprise a second symbol that may carry data relating to the modulation parameters that are used in subsequent data symbols. In another embodiment, the symbols comprise a third symbol that may be used for channel estimation.

Figure 4:
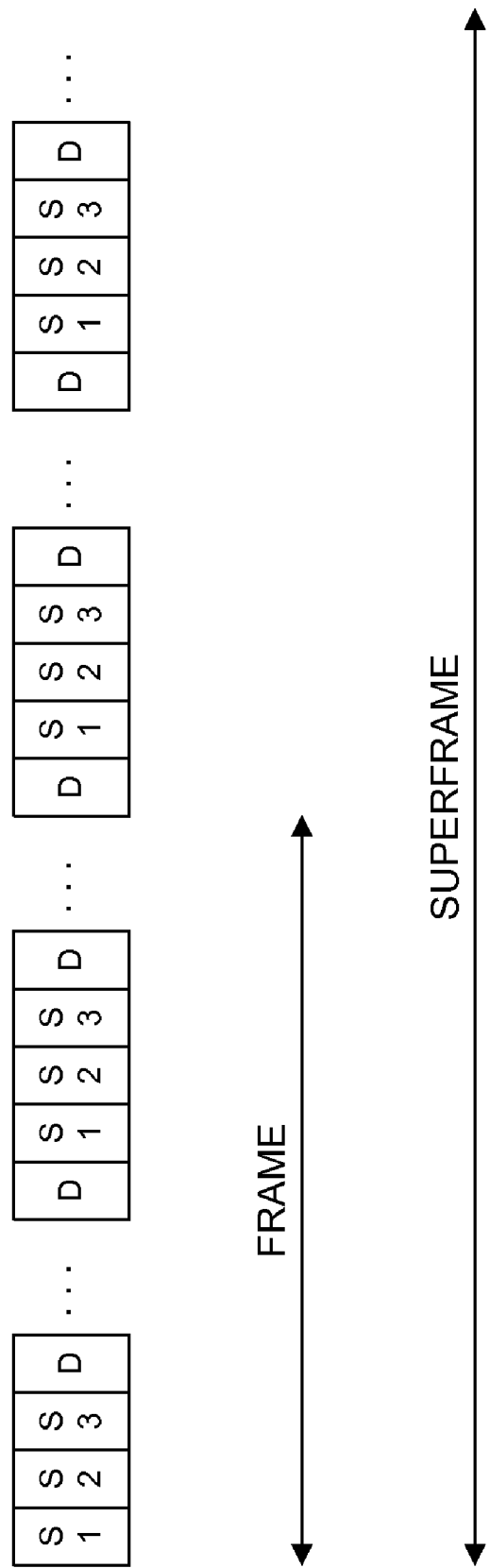
FIG. 4 shows a frame and superframe of symbols, synchronization symbols used for channel searches and service discovery, and data in accordance with an aspect of the invention.

FIG. 4 shows a frame and superframe of symbols, synchronization symbols, S1-S3, used for channel searches and service discovery, and data D in accordance with an aspect of the invention.

In various digital broadcast networks, a multicarrier signal may be positioned relative to the channel raster so that the signal center frequency (SCF) coincides with the channel center frequency (CCF), or it may be offset from the channel center frequency. The signal center frequency may be offset due to frequency spectrum use reasons (e.g. interference from a neighboring channel). For the first symbol, not all available subcarriers are used. In various embodiments, the subcarriers that are selected for the first symbol may be evenly spaced and may be symmetrically positioned with regard to the channel center frequency or the offset signal frequency.

Figure 5:
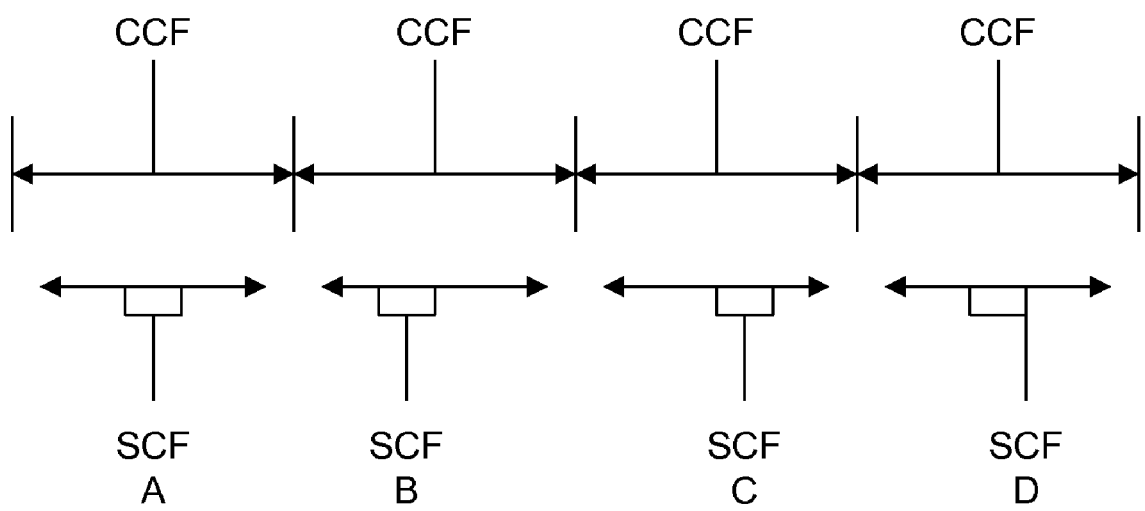
FIG. 5 shows how a signal center frequency may coincide with, or be offset relative to, a channel center frequency.

FIG. 5 shows how a signal center frequency may coincide with, or be offset relative to, a channel center frequency (CCF). In FIG. 5, SCF A and its corresponding CSF coincide, SCF B and SCF C are offset with regard to the corresponding CSFs. The rectangles in FIG. 5 illustrate the subcarriers selected for the first symbol from the available subcarriers. For SCF A, SCF B, and SCF C, the selected subcarriers are centered around the respective SCFs. The selected subcarriers for SCF D, however, are centered around the CCF, as opposed to the SCF.

For the first symbol used for channel searches and service discovery, the subcarriers may be selected so that they may be found irrespective of the offset. In the first symbol, a fixed Fast Fourier Transform (FFT) may be used. The fixed FFT may be selected from the available FFT sizes that in present digital video broadcast systems include 2K, 4K, 8K, but may also include 1K at the lower end and 16K at the higher end. In one embodiment, the lowest available FFT is used. Further, the first symbol may use a fixed guard interval (GI) that may be selected from the GIs used for the symbols carrying data. The first symbol may, in one embodiment, have no guard interval.

The number of subcarriers for the first symbol may be less than half of the available subcarriers.

When the first symbol is used for channel offset signaling, the carriers may be modulated using Binary Phase Shift Keying (BPSK) or Quadrature Phase Shift Keying (QPSK). The selected pilot pattern may be different for different channel offset values, and the pilot pattern and subcarrier modulation may be selected, in one embodiment, so that the different pilot patterns are orthogonal to each other and differ from each other maximally thus allowing robustness in detection. In one embodiment the different pilot patterns may signal the FFT-size only and the frequency offset is found by detecting the shift from the nominal center frequency.

For the second (and third, if present) symbol the full signal bandwidth (substantially all available carriers) may be used. In an embodiment, the second (and third) symbol may use the same FFT size and guard interval as the first symbol. In some embodiments, not all of the available subcarriers are used for the second (and third) symbols. In one embodiment, the second and third symbol may have the same subcarriers as pilot subcarriers and, in a further embodiment, have additional subcarriers used as pilots. In one embodiment, the second symbol also carries signaling data and, further, may carry forward error correction data (FEC) for the signaling data.

In accordance with embodiments, a part of a signal (e.g. initialization/synchronization symbol(s)) is introduced that has known characteristics and remains the same with different digital video broadcast operation modes. The known part of signal contains parameters for the rest of the signal; therefore, the rest of the signal can be decoded without trial and error methods after the known part is decoded. Also, the channels containing digital video broadcast services can be efficiently detected using the known part of the signal. If the fixed known part is not found from the examined signal, then the signal will be considered a non-digital-video-broadcast signal or an empty channel, and the receiver can promptly proceed to a next channel/frequency.

Figure 6:
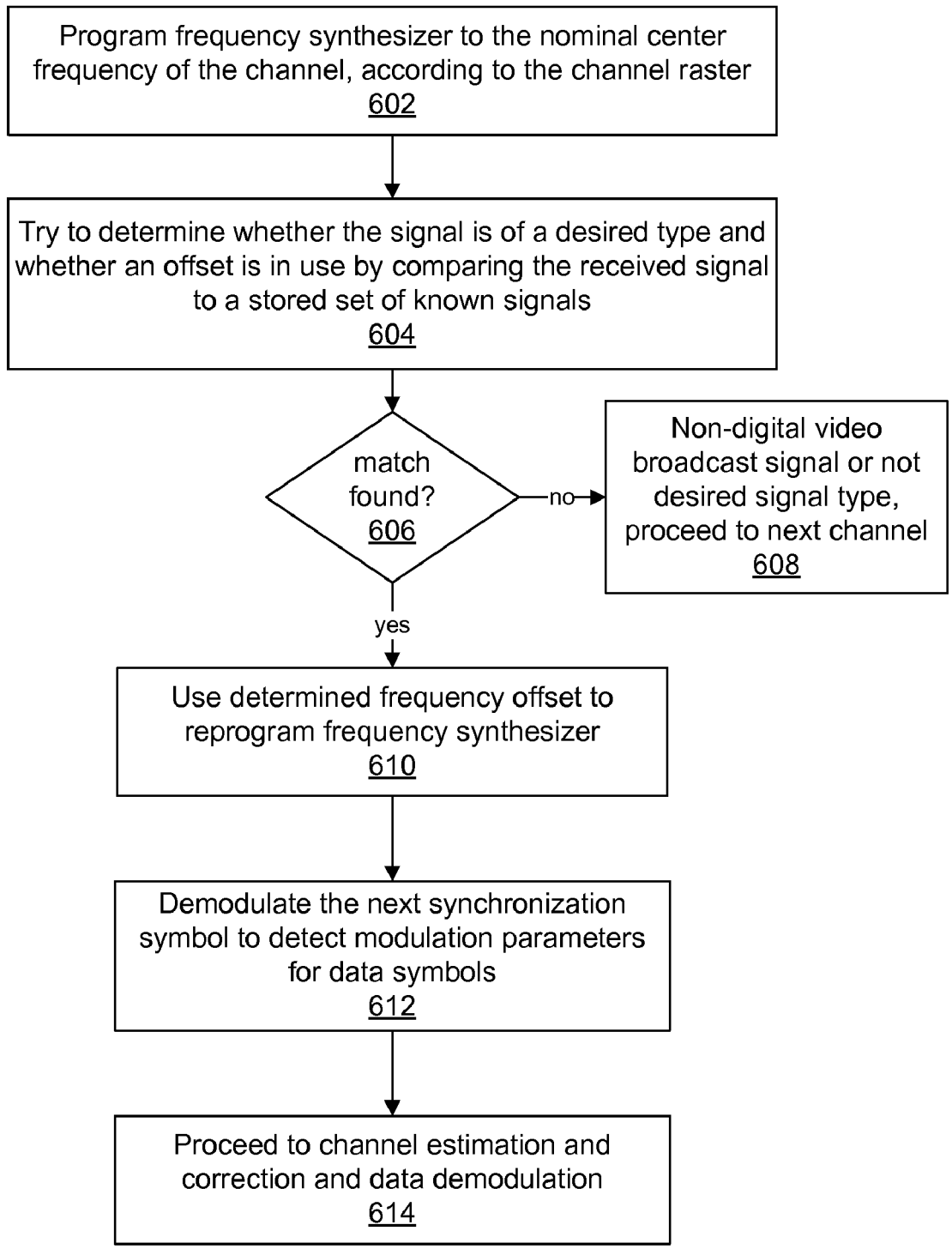
FIG. 6 is a flow chart showing steps performed by a receiver in accordance with at least one embodiment.

FIG. 6 is a flow chart showing steps performed by a receiver in accordance with at least one embodiment. A frequency synthesizer in the receiver is programmed to the nominal center frequency of the channel, according to the channel raster, as shown at 602 for receiving a signal on the channel. An attempt is made to determine whether the received signal is of a desired type and whether an offset is in use by comparing the received signal to a stored set of known signals, as shown at 604. If a match is found, the signal is determined to be of the desired type and the offset and FFT size for the signal can be determined. A determination is made with respect to whether a match was detected, as shown at 606. If a match is not detected, then the "no" branch from 606 is followed, the channel is considered to contain a non-digital-video-broadcast signal or the received signal is not of the desired type, and processing proceeds to the next channel, as shown at 608.

Otherwise, if a match is detected, then the "yes" branch from 606 is followed, the determined frequency offset is used for reprogramming the frequency synthesizer, as shown at 610. The next synchronization symbol is demodulated to detect modulation parameters for data symbols, as shown at 612. Finally, channel estimation and correction and data demodulation are then performed, as shown at 614.

In case the reprogramming of the frequency synthesizer takes a relatively long time, the receiver may wait for the next set of initialization/synchronization symbols and demodulate the modulation parameters from that set.

Figure 7:
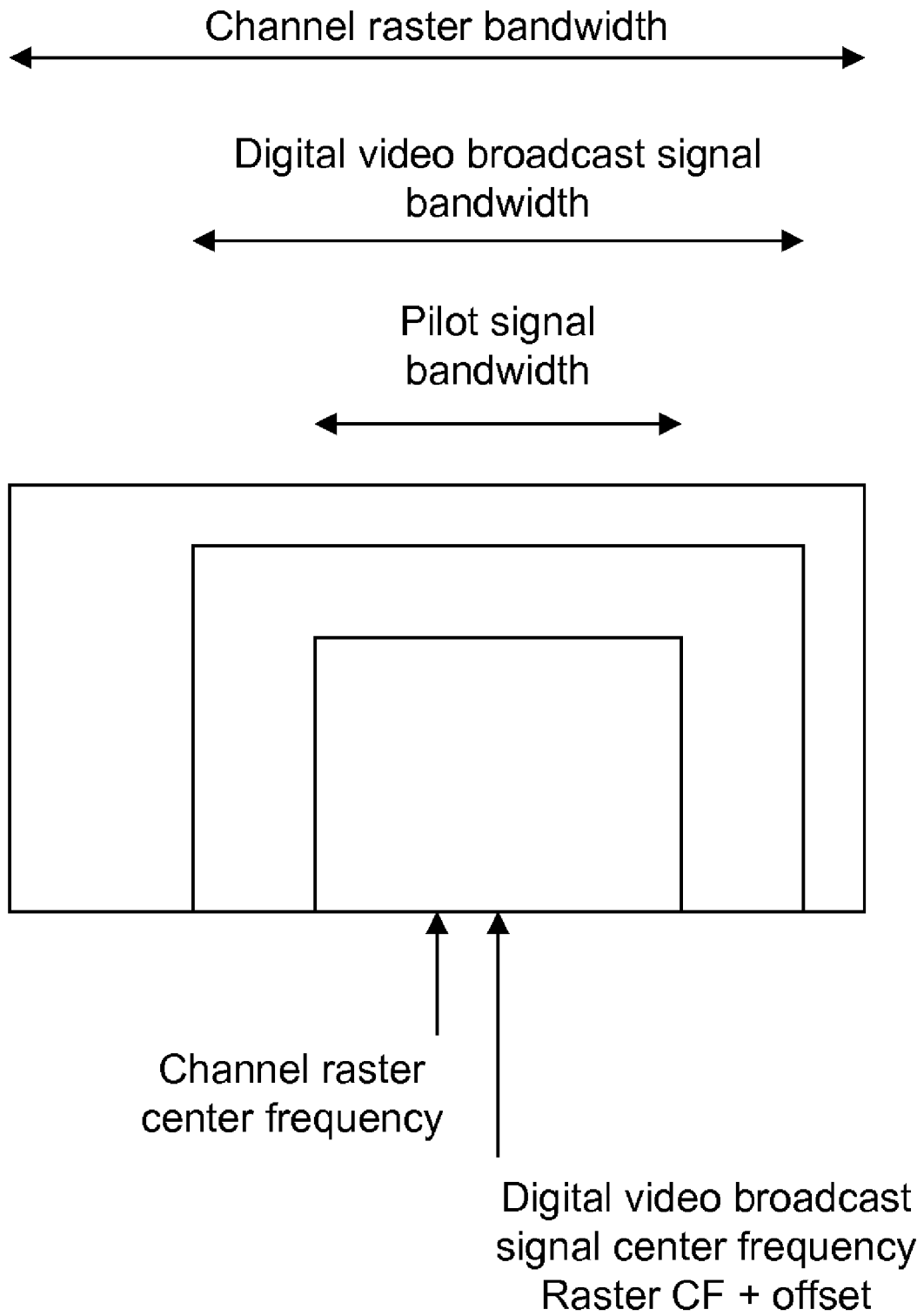
FIG. 7 shows an example of the size of a pilot signal bandwidth relative to a signal bandwidth and a channel raster bandwidth in accordance with an aspect of the invention.

FIG. 7 shows an example of the size of a pilot signal bandwidth relative to a signal bandwidth and a channel raster bandwidth in accordance with an aspect of the invention. In an embodiment, the first symbol is a pilot symbol for coarse frequency and timing synchronization. The bandwidth of the pilot symbol is smaller than the actual data symbol, e.g. in 8 MHz data symbol case, the pilot symbol could be 7 MHz wide. The pilot symbol center frequency may be the same as the frequency for the data symbols, i.e., in case an offset is used for data symbols, the offset may also be used for the pilot symbol. With the pilot symbol's smaller bandwidth, the receiver's RF part can be programmed to the nominal channel center frequency during the initial synchronization phase and still be set to receive the pilot symbol's whole bandwidth.

Without the pilot symbol's smaller bandwidth, the receiver's RF channel selection filter would filter out part of the pilot symbol.

In an embodiment, the pilot symbol may use known (fixed) FFT and Guard Interval selection. Also the number of used pilots may be different than for data symbols, i.e., part of the pilots can be extinguished, e.g., 256 pilots could be used. The pilots may be modulated with a known sequence.

Figure 8:
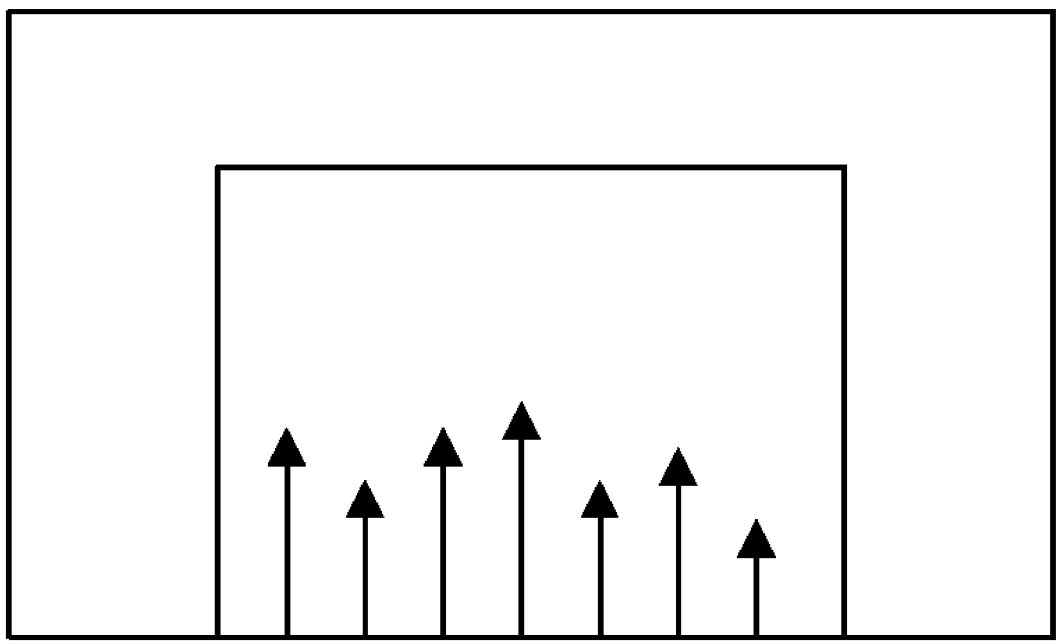
FIG. 8 illustrates sparse pilot spacing of a pilot sequence for a pilot symbol in accordance with an aspect of the invention.

FIG. 8 illustrates sparse pilot spacing of a pilot sequence for a pilot symbol in accordance with an aspect of the invention. The modulation sequence "finger print" for the pilot pattern may be known by the receiver. In addition to modulation, the subcarriers in the pilot symbols may also have different boosting levels, as illustrated in FIG. 8.

Figure 9:
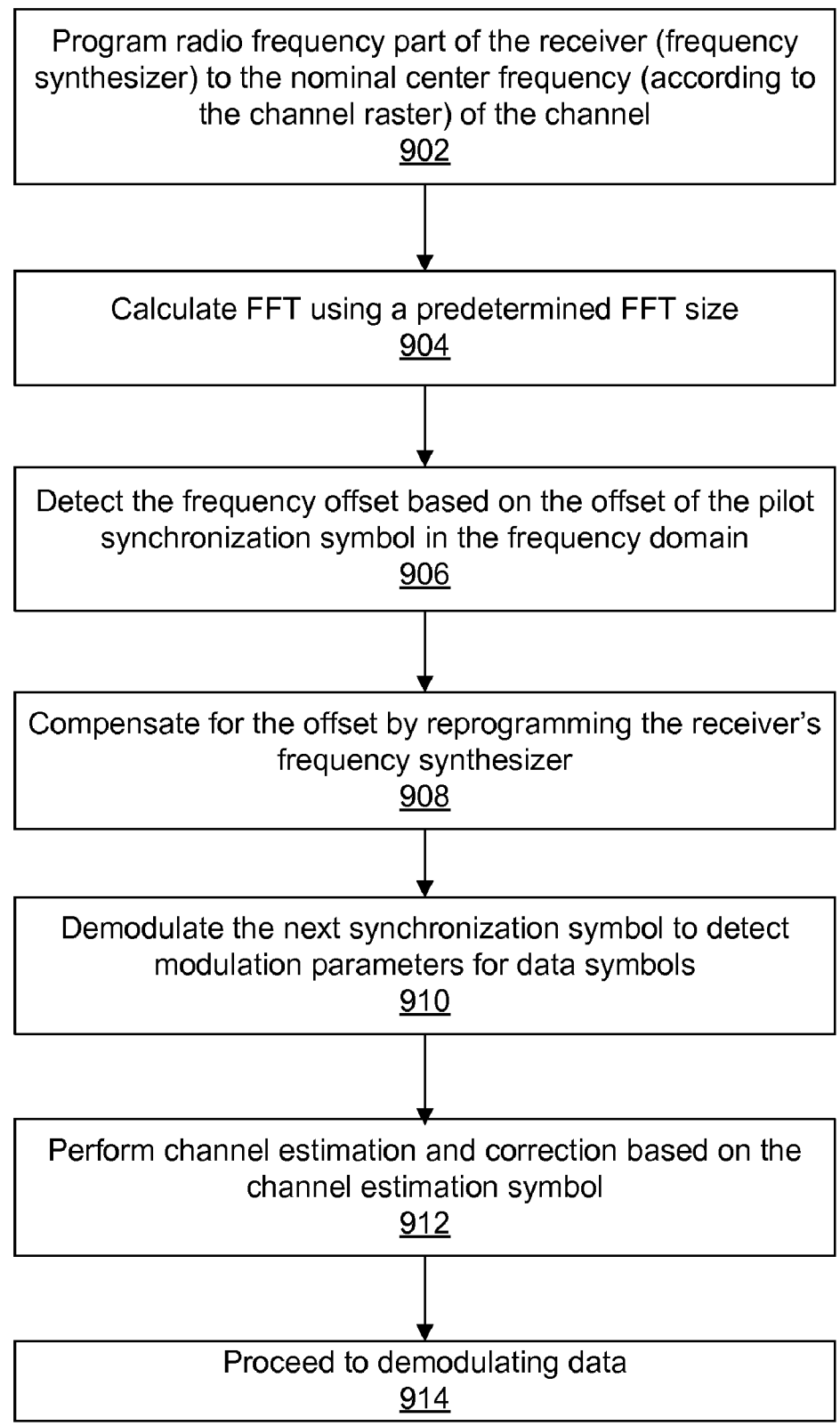
FIG. 9 is a flowchart showing steps performed by a receiver for performing correlation in the frequency domain to detect the coarse offset being used.

FIG. 9 is a flowchart showing steps performed by a receiver for performing correlation in the frequency domain to detect the coarse offset being used. A radio frequency part of the receiver (frequency synthesizer) is programmed to the nominal center frequency (according to the channel raster) of the channel, as shown at 902.

An FFT is calculated using a predetermined FFT size as shown at 904. The width of the pilot symbol is smaller than the channel bandwidth. Therefore, the FFT is able to capture the pilot symbol even when an initial setting for frequency synthesizer is wrong because of the offset.

The frequency offset is detected based on the offset of the pilot synchronization symbol in the frequency domain, as shown at 906. If non-correlation in the frequency domain is found, then the signal is not a digital video broadcast signal and channel search can proceed to the next channel.

The offset is compensated for by reprogramming the receiver's frequency synthesizer, as shown at 908. The next synchronization symbol is demodulated to detect modulation parameters for data symbols, as shown at 910. Channel estimation and correction based on the channel estimation symbol is performed, as shown at 912, and then data is demodulated as shown at 914. In an embodiment the receiver may wait for a synchronization symbol in the next set of synchronization symbols thus allowing the frequency synthesizer to be reprogrammed to the signal center frequency.

Different pilot sequences (finger prints) may be used based on the offset in use. For example, if 7 offsets are possible (±3/6 MHz, ±2/6 MHz, ±1/6 MHz, 0), 7 different pilot sequences may be introduced. Several methods can be utilized to construct the pilot sequence including, but not limited to: pseudo random sequence, inverting every second, boosting the center carrier, and the like. In accordance with an embodiment, the receiver performs a correlation in the time domain to detect the used pilot sequence, and, therefore, the offset used. The finger prints may be used in accordance with one or more embodiments directed to performing a time domain correlation. But, frequency domain embodiments, the offset can be detected by a sliding correlator in the frequency domain, that is, a single finger print may be used. Additionally, one could code information like FFT size for frequency domain embodiments if different finger prints are used for different FFT sizes, for example. Then, a frequency domain correlation could be run with several finger prints. In an embodiment, if there are several finger prints in use, the received fingerprint may be compared simultaneously to several stored finger prints. A received pilot sequence may be translated in frequency domain stepwise over the channel bandwidth, wherein a high correlation signal is produced when the pilot sequences coincide.

Figure 10:
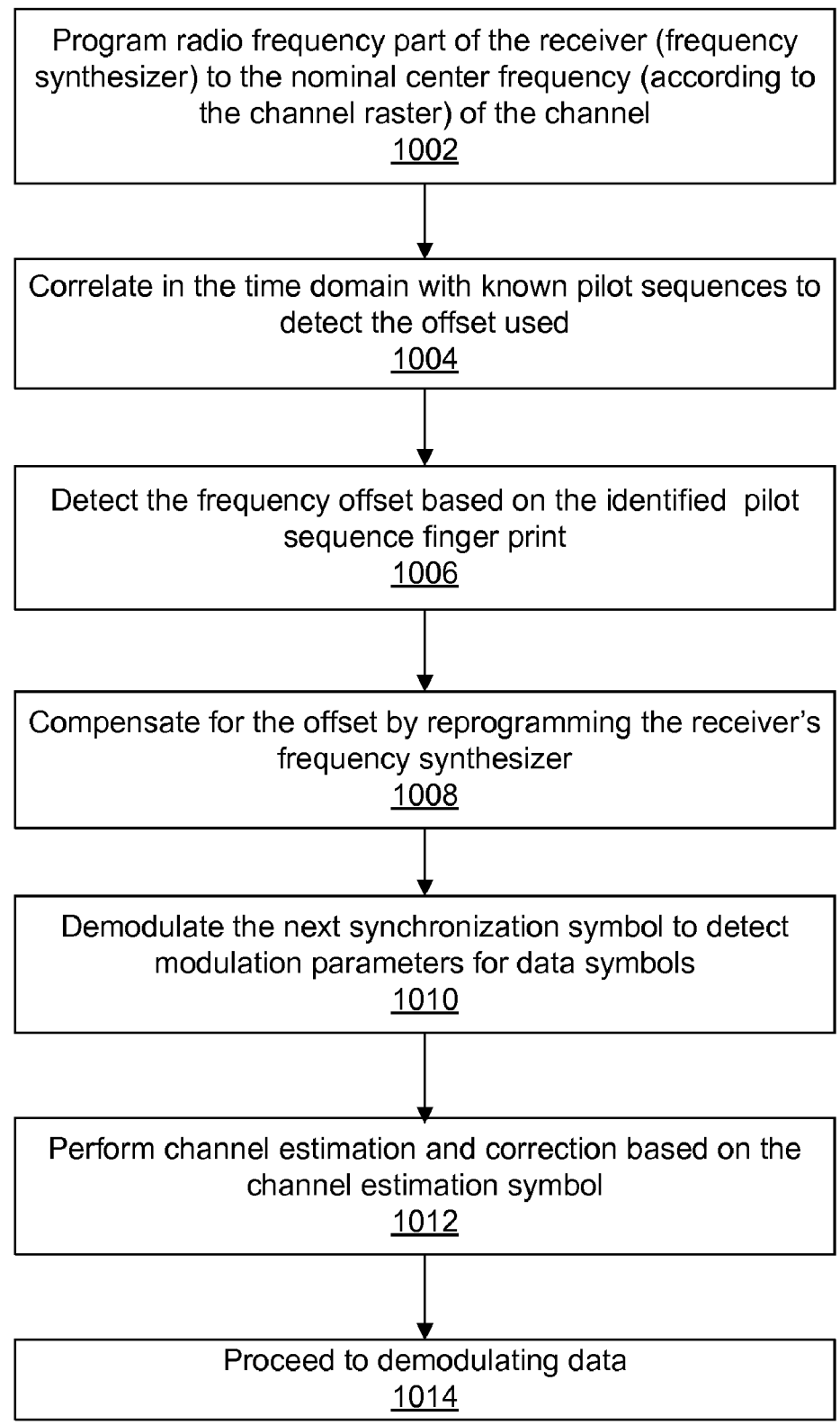
FIG. 10 is a flow chart that shows steps in accordance with an embodiment for performing a service discovery correlation in the time domain.

FIG. 10 is a flow chart that shows steps in accordance with an embodiment for performing a service discovery correlation in the time domain. A radio frequency part of the receiver (frequency synthesizer) is programmed to the nominal center frequency (according to the channel raster) of the channel, as shown at 1002.

In one embodiment a correlation of the received pilot sequence is performed in the time domain with known pilot sequences to detect the offset used, as shown at 1004. For examples, if seven offsets are in use, seven different pilot sequences (finger prints) are defined. Each coarse offset corresponds to a particular pilot sequence finger print.

Based on the correlation, the finger print used, i.e., the offset used, can be detected. The pilot sequence will be in the nominal center frequency of the channel (according to the channel raster). In one embodiment a set of pilot symbols are defined so that each of them corresponds to a frequency offset-FFT size pair, wherein based on the detected correlation both the offset and FFT size can be detected.

The frequency offset is detected based on the identified pilot sequence finger print, as shown at 1006. If none of the pilot sequences show correlation, then the signal is not a desired digital video broadcast signal, and search can proceed to the next channel.

The offset is compensated for by reprogramming the receiver's frequency synthesizer, as shown at 1008. The next synchronization symbol is demodulated to detect modulation parameters for data symbols, as shown at 1010. Channel estimation and correction based on the channel estimation symbol is performed, as shown at 1012, and then data is demodulated as shown at 1014. In one embodiment the receiver may wait for a next set of synchronization symbols for allowing the frequency synthesizer to be reprogrammed.

After the offset has been found and the frequency synthesizer is reprogrammed, the second symbol (i.e., the symbol following the pilot symbol) may use fixed FFT and Guard Interval selection, but would use the full signal bandwidth. The second symbol may then contain specific information about the modulation parameters for the subsequent data symbols. In another embodiment the second symbol may use the FFT that is signaled in the first symbol.

An optional third symbol could be inserted before the data symbols to facilitate channel estimation.

FIG. 11 shows an example of a pilot/signaling symbol sequence in accordance with an aspect of the invention. The pilot symbol 1102 and the Signaling Symbols 1104 and 1106 may be repeated in the transmission frequently enough, e.g., every 50 ms, to enable signal detection and synchronization as fast as is desired. The first pilot symbol 1102 is used for coarse frequency and time synchronization, and, in addition, it may also carry information on the FFT size for the following symbols. The FFT, guard interval, and the modulation are fixed for the first symbol. In one embodiment the second symbol 1104 comprises the same pilot subcarrier as the first symbol but may have, in addition, more subcarriers that are used as pilot subcarriers. The second signaling symbol also carries signaling data comprising FFT size, guard interval, and modulation parameters. The third signaling symbol comprises still more pilots that are used for channel estimation and fine timing.

The modulation parameter for data symbols (like constellation, QPSK vs. 16QAM vs. 64QAM) may be varied frequently because the repeated signaling symbols carry information about the selected parameters.

Figure 12:
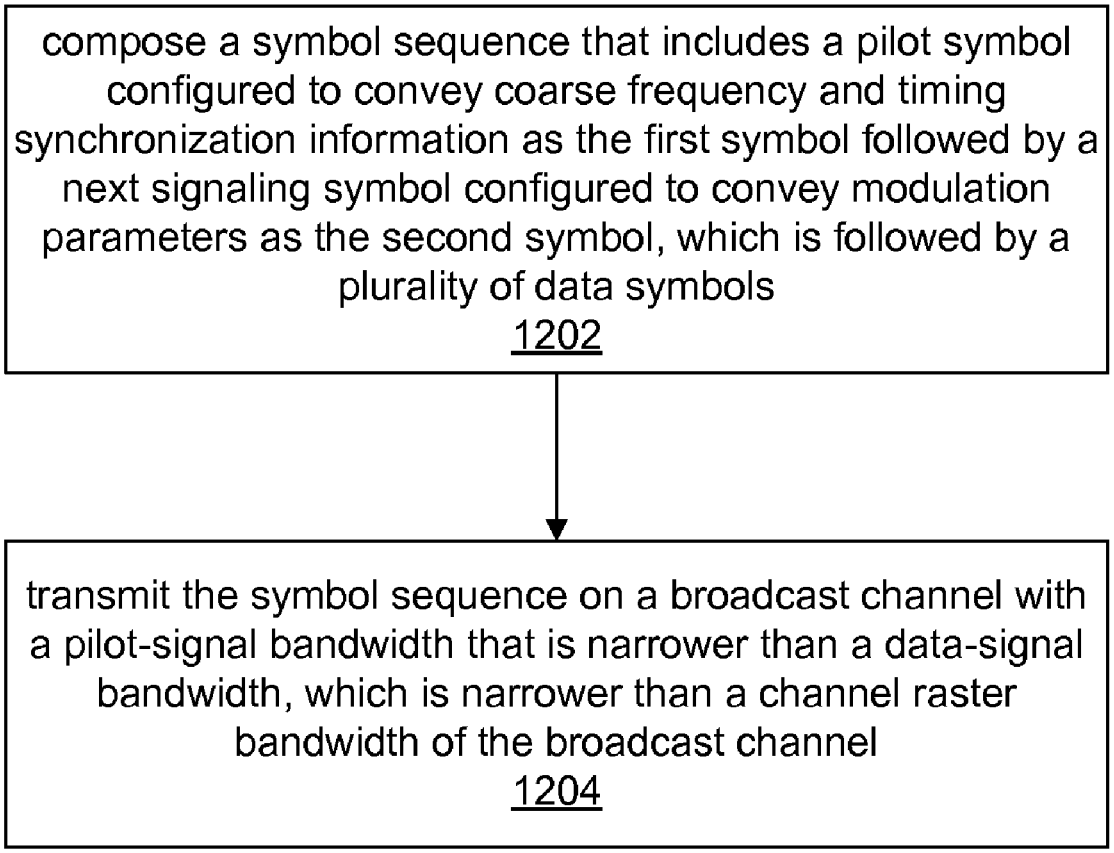
FIG. 12 is a flowchart showing steps of a method performed by a transmitter in accordance with at least one aspect of the invention.

FIG. 12 is a flowchart showing steps of a method performed by a transmitter in accordance with at least one aspect of the invention. A symbol sequence is composed that includes a pilot symbol configured to convey coarse frequency and timing synchronization information as the first symbol followed by a next signaling symbol configured to convey modulation parameters as the second symbol, which is followed by a plurality of data symbols, as shown at 1202. In one embodiment the second signaling symbol may be followed by a third signaling symbol. The symbol sequence is then transmitted on a broadcast channel with a pilot-signal bandwidth that may be narrower than a data-signal bandwidth, which further may be narrower than a channel raster bandwidth of the broadcast channel, as shown at 2004.

Figure 13:
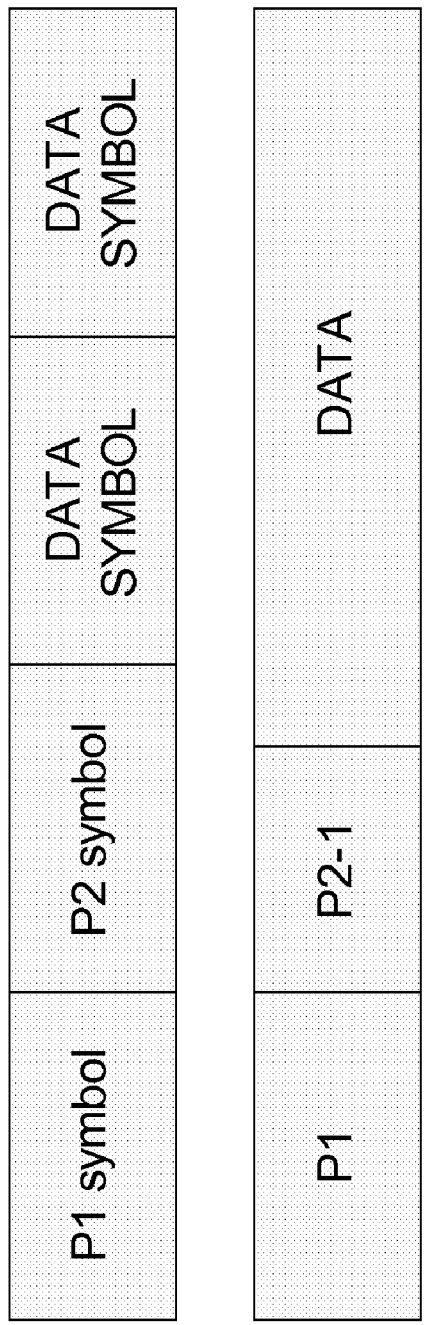

FIG. 13 and FIG. 14 depict the relation between P1, P2 and DATA symbols (i.e. OFDM symbols) by example. From FIGS. 13 and 14, it may be seen how data has been split for the duration of P2 and data symbols. The data packets may be placed immediately after the last P2-*n* packet and both are carried within the 'DATA symbols.'

Figure 15:
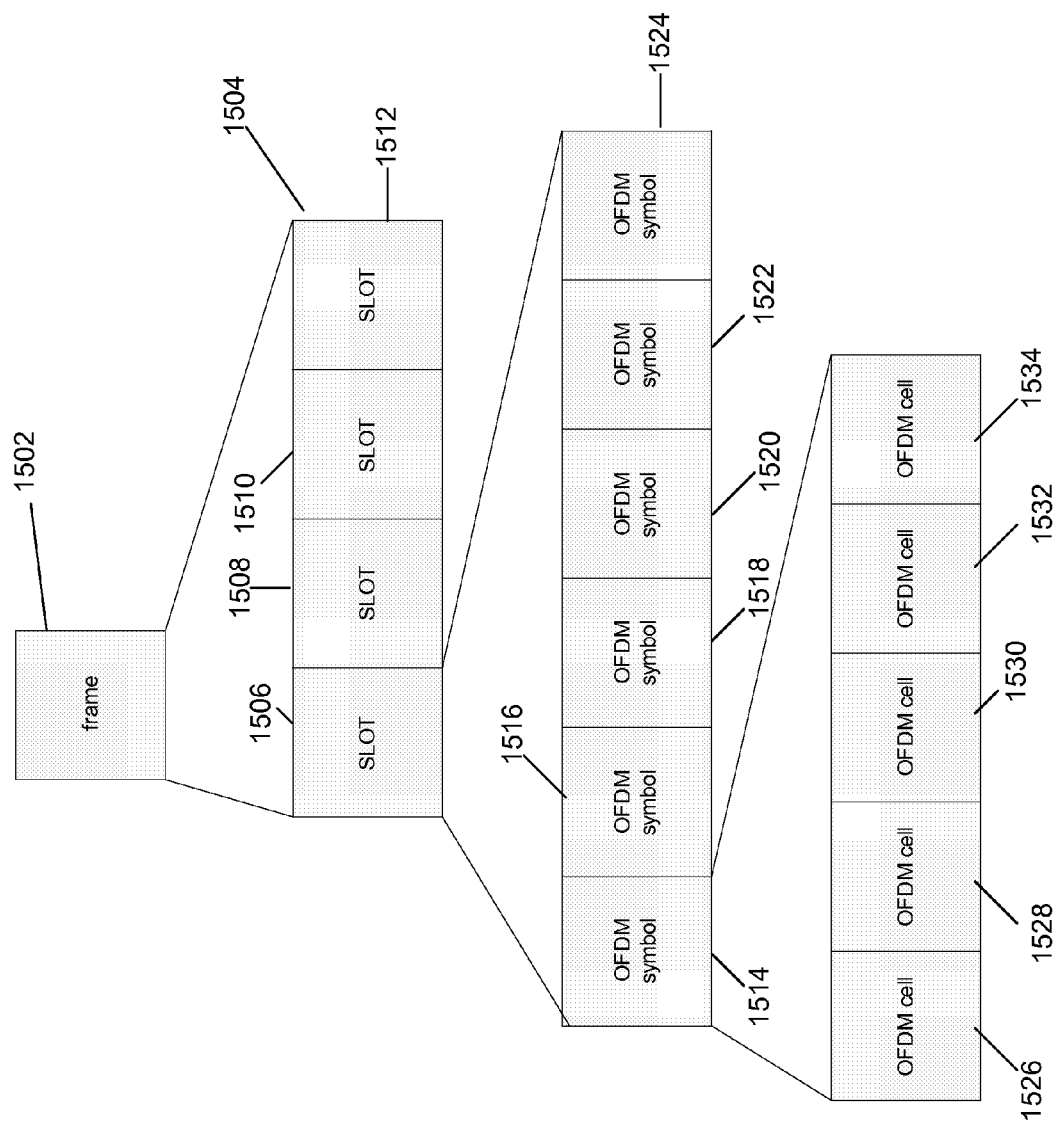
FIG. 15 shows an exemplary frame and slot structure including OFDM symbols and cells in accordance with an aspect of the invention.

FIG. 15 shows an exemplary frame and slot structure in accordance with at least one aspect of the invention. In FIG. 15, a frame 1502 may consist of one or more slots 1504. For example, frame 1502 includes slot 1 1506 through slot 4 1512. Each slot 1506-1512 may include several OFDM (orthogonal frequency division multiplexing) symbols, typically from a few symbols up to some tens of symbols. The services are allocated to these slots so that one or more slots are used for a service. For example, slot 1 1506 may includes a number of OFDM symbols 1514 through 1524. Furthermore, each OFDM symbol may include numerous OFDM cells. For instance, OFDM symbol 1514 includes OFDM cells 1526 through 1534.

Embodiments are related to initial service discovery in a Digital Video Broadcasting-Terrestrial next generation (DVB-T2) system. The DVB-T2 system may include a preamble, which is intended for efficient identification of available T2 signals. The preamble should not consume too much capacity, but it should be compatible with different Fast Fourier Transform (FFT) sizes (2k, 4k, 8k, 16k, and 32k). Minimizing the overhead has lead to using a 2k symbol (P1) for each FFT-size and signalling the actual FFT-size within this symbol by modulating the carriers by different pseudo random binary sequences (PRBS). To find out the FFT-size of the following symbols, the receiver detects the modulating PRBS. This PRBS also indicates the integer frequency shift (DVB-T2 signal can be shifted by +/−1/6, +/−2/6, +/−3/6 MHz compared to the nominal center frequency). To summarise, the P1 symbols are used in the initial scan to: (1) detect the presence of T2 signal; (2) estimate the frequency offset; and (3) detect the used FFT size.

After the initial scan, the P1 symbol may not be used during normal data reception or handover because the parameters carried by P1 (i.e., FFT size and frequency offset) remain constant. With respect to handovers, these parameters are the same between radio frequency (RF) channels or they are signalled before a handover (e.g., in Program Specific Information/Service Information (PSI/SI) according to ETSI EN 300 468 Digital Video Broadcasting (DVB); Specification for Service Information (SI) in DVB systems). P1 can, however, be used during normal data reception to, for example, detect the frame start or to improve synchronization and channel estimation algorithms. P2 symbol(s) is/are a signalling and channel estimation symbol(s) which is/are located after the P1.

The detection of P1, and, thus, the detection of the DVB-T2 signal, is based on a guard interval correlation (GIC). In GIC, the guard interval is correlated with the end of the symbol. A peak in the GIC indicates a potential DVB-T2 signal, which may be verified from the P2 symbol. The first problem is that the guard interval should be long in order to provide robust detection (i.e., a long guard interval provides higher signal to noise ratio). A longer guard interval, and thus a longer P1, however, decreases data capacity.

Since P1 is the first symbol to be received, there is typically no prior knowledge of the channel conditions. Therefore, the P1 symbol should include some means to overcome the channel distortions. In practice, this would mean using, e.g., extra pilot carriers for channel estimation or differential modulation between the subcarriers.

Because of the lower FFT-size, the carrier spacing of the P1 symbol may not be as dense as in the following data symbols (e.g., 2k for P1 and 32k for data). For a successful PRBS detection in P1, the coherence bandwidth of the channel should be smaller than the subcarrier spacing of a 2k symbol. However, the network might be designed for the 32k mode, and the long Single Frequency Network (SFN) delays might produce much higher frequency selectivity.

The complex valued received signal at carrier index k may be expressed as $r_k=h_k s_k+n_k$, where $s_k$ is the transmitted data symbol (e.g. using Quadrature Phase Shift Keying (QPSK)), $h_k$ is the channel response at the carrier index k, and $n_k$ is the noise term.

In coherent demodulation, $h_k$ is first estimated using pilots, and then the effect of the channel is equalized by, for example, dividing $r_k$ by estimated $h_k$.

If we consider DVB-T2 and P1 symbol, there are no pilots to estimate $h_k$. Therefore, non-coherent demodulation will typically be used, without channel estimation. This may be done by using differential modulation (e.g. Differential Binary Phase Shift Keying (DBPSK)) where the information is coded to the phase difference between two adjacent carriers. These two adjacent carriers may be expressed as $r_k=h_k s_k+n_k$ and $r_{k+1}=h_{k+1}s_{k+1}+n_{k+1}$. The transmitted symbol may be decoded from the phase difference between these two received carriers: $r_{k+1}-r_k=h_{k+1}s_{k+1}-h_k s_k+n$.

Figure 16:
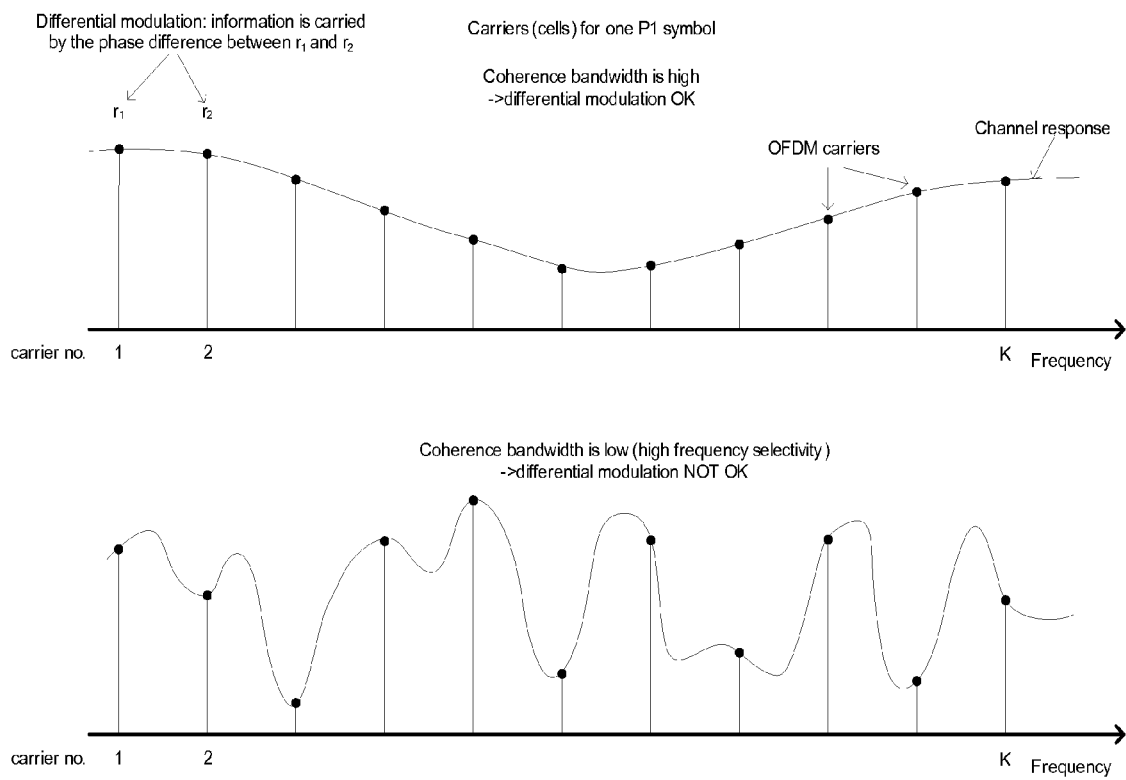
FIG. 16 illustrates coherence bandwidth and differential modulation within one pilot symbol.

FIG. 16 illustrates coherence bandwidth and differential modulation within one pilot (P1) OFDM symbol. It is assumed that the phases of the channel responses $h_k$ and $h_{k+1}$ are approximately the same, as shown in the upper graph of FIG. 16. However, in a highly frequency selective channel (e.g., the lower graph of FIG. 16), the correlation between adjacent channel responses is relatively low. This makes it impracticable to use differential modulation between carriers.

The coherence bandwidth (i.e., the bandwidth where the channel response is highly correlated) can be approximated by $$W_{coh} \approx \frac{1}{\tau_d},$$

where $\tau_d$ is the delay spread of the channel. The coherence bandwidth of the channel should be lower than the carrier spacing in order to use DBPSK between carriers. The FFT size of P1 is 2k, and the carrier spacing in 8 MHz channel is 4.46 kHz. From these carriers every $3^{rd}$ or $9^{th}$ carrier is used. Therefore, the actual carrier spacing can be even 40.1 kHz. On the other hand, the delay spread in large SFN network can be 448 μs (16k mode with ¼ guard interval) resulting in a coherence bandwidth of 2.2kHz.

In accordance with an aspect of the invention, two P1 symbols are used, e.g., 1k symbol with GI=1/1. Both symbols are separately used in GIC. When GI=1/1, the whole symbol duration may be utilized in GIC.

Figure 17:
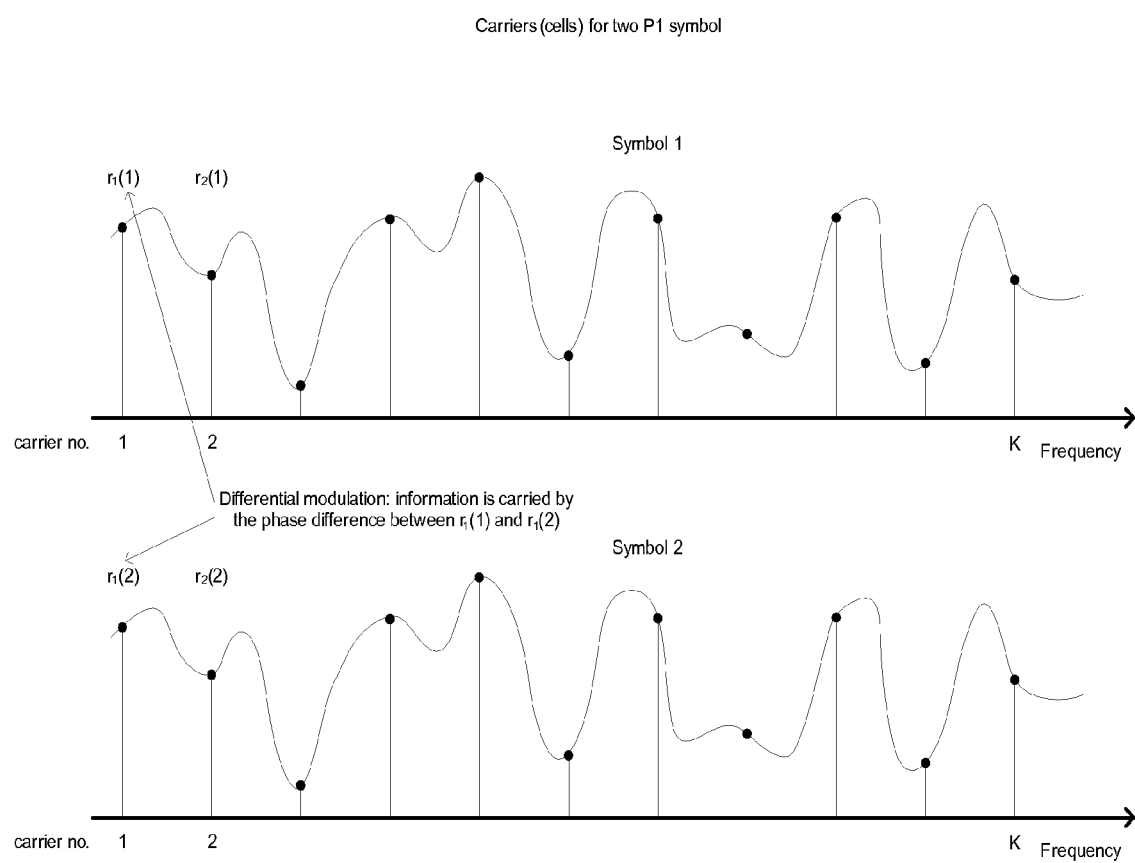
FIG. 17 depicts differential modulation between two P1 symbols in accordance with an aspect of the invention.

In accordance with an aspect of the invention, differential modulation is applied between two P1 symbols as shown in FIG. 17. Because the differential modulation is now performed subcarrierwise, there are no requirements for the coherence bandwidth. (Alternatively, the first P1 symbol could be used for channel estimation, which would allow coherent demodulation for the second P1 symbol.)

The time interval of two P1 symbols is relatively short such that the channel does not change from the first symbol to the second symbol. Therefore, in accordance with one or more embodiments, the differential modulation can be done in the time domain between carriers having the same carrier number.

Embodiments also support mobile reception. In accordance with embodiments, the coherence time of the channel is longer than the duration of two P1 symbols. This makes the correlation between $r_k(1)$ and $r_k(2)$ high. The coherence time of the channel can be approximated by $$\tau_{coh} \approx \frac{1}{F_d},$$

where $F_d$ is the Doppler spread of the channel and it is given by $$F_d = \frac{v}{c} F_c,$$

where v is the speed of the receiver, c is the speed of the light ($3*10^8$ m/s), and $F_c$ is the carrier frequency. If v=120 km/h and $F_c$=666 MHz, then $F_d$=74 Hz and $\tau_{coh}$=13.5 ms, which is significantly longer than the duration of a P1 symbol (e.g., 280 µs).

In accordance with one or more embodiments, symbol synchronization of P1 may be improved. The P1 symbols may have a 1/1 guard interval, which would improve symbol synchronization and maximize guard interval correlation length with respect to overhead. The P1 symbols may use a 1 k FFT, which would decrease overhead compared to two 2k symbols.

Guard interval correlation (GIC) is a basic method for synchronization in Orthogonal Frequency Division Multiplexing (OFDM) symbols. Since the GI is a cyclic copy of the last part of the actual OFDM symbol, the receiver is able to find the beginning of an OFDM symbol by detecting this correlation. In practice, the receiver continuously correlates two blocks of the received signal, which are separated by N samples (N is the FFT size and also the number data samples). A correlation peak is detected at the correct position.

Figure 18:
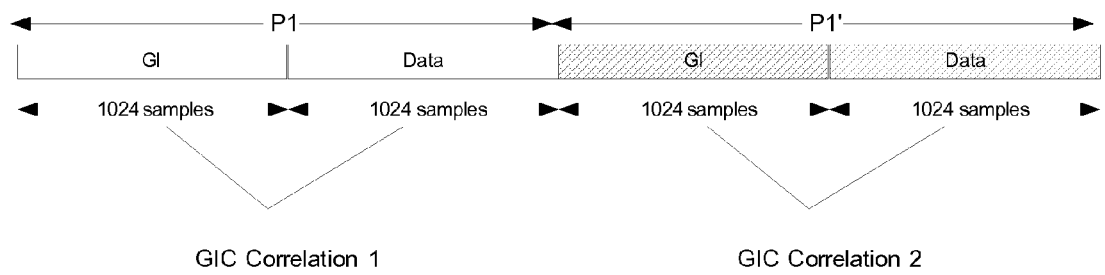
FIG. 18 shows two 1k symbols with 1/1 guard interval and differential modulation between the symbols in accordance with an embodiment.

FIG. 18 shows two 1k symbols with 1/1 guard interval and differential modulation between the symbols. As can be seen, the 1/1 guard interval means that the GI and the data part have the same length, and the samples are also equal. Equivalently, the 1/1 symbol could be said to have two equal symbols without guard interval.

Because of differential modulation, the consecutive symbols, P1 and P1', are different, which means that a normal GIC should be applied within each P1 symbol. The correlation length, however, is doubled compared to a 2k ¼ GI symbol (¼*2048=512), and the correlations from the two symbols can be combined for further improvements. The 1k 1/1 GI symbol is also desirable since the guard interval correlation does not now match to the data modes (2k, 4k, etc.).

Figure 19:
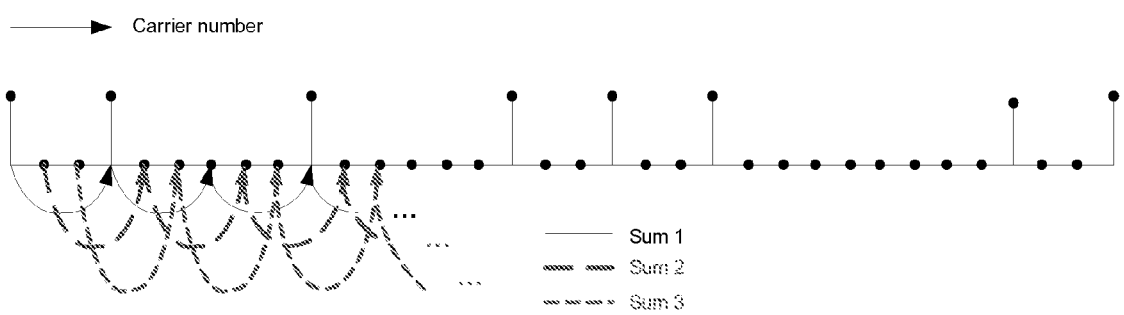
FIG. 19 shows calculation of sums of received energy from one or more pilot symbols in accordance with one or more embodiments.

Another embodiment speeds up the initial scan. It is desirable to quickly detect non-T2 signals so that the receiver can tune to the next frequency. This can be done by detecting the zero carriers in the P1 symbol by: (1) calculating three sums (see FIG. 19, which shows calculation of sums of received energy from P1 in accordance with one or more embodiments) of received energy for carriers that belong to the subsets $r_{3k}$, $r_{3k-1}$, and $r_{3k+1}$, where r is the kth carrier of P1 symbol(s) and k=1, 2, 3 . . . ; and (2) detecting the existence of T2-signal by comparing the received energy on the three subsets; and (3) setting an energy threshold (e.g. 5 dB below the strongest); and (4) if only one sum exceeds the threshold, a possible T2 signal is detected.

Figure 20:
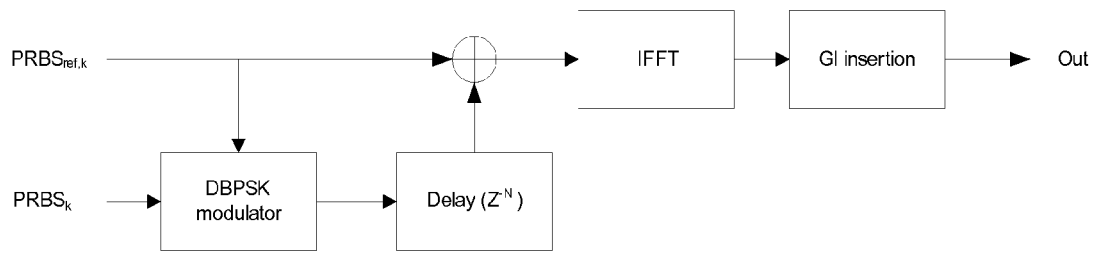
FIG. 20 shows a transmitter in accordance with one or more embodiments.

FIG. 20 shows a transmitter in accordance with one or more embodiments. The first P1 is BPSK modulated according to a reference sequence, and the second P1 is modulated as follows: if $PRBS_k=0 \rightarrow b_{k,2}=b_{k,1}$; if $PRBS_k=1 \rightarrow b_{k,2}=-b_{k,1}$ (or vice versa), where $PRBS_k$ is the kth element of the PRBS, and $b_{k,m}$ is the transmitted symbol on kth carrier at mth P1 symbol. Next, the transmitter combines the original reference sequence and the delayed differentially modulated sequence before the Inverse Fast Fourier Transform (IFFT) and guard interval insertion. N refers to the FFT size.

Figure 21:
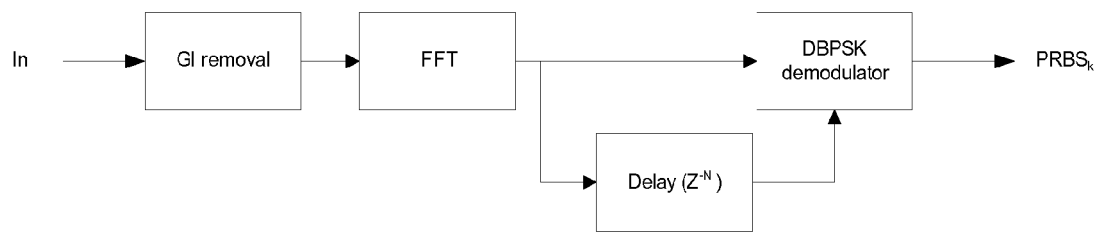
FIG. 21 shows a receiver in accordance with one or more embodiments.

FIG. 21 shows a receiver in accordance with one or more embodiments. The receiver performs the inverse of the transmitter operations discussed above in connection with FIG. 20. That is, the receiver removes the guard interval from the P1 symbols (first and second pilot symbol), performs a fast fourier transform on the P1 symbols, and thereafter differentially demodulates P1 symbols to obtain an estimate of the transmitted pseudo random binary sequence. The receiver does not have to know the reference sequence.

Figure 22:
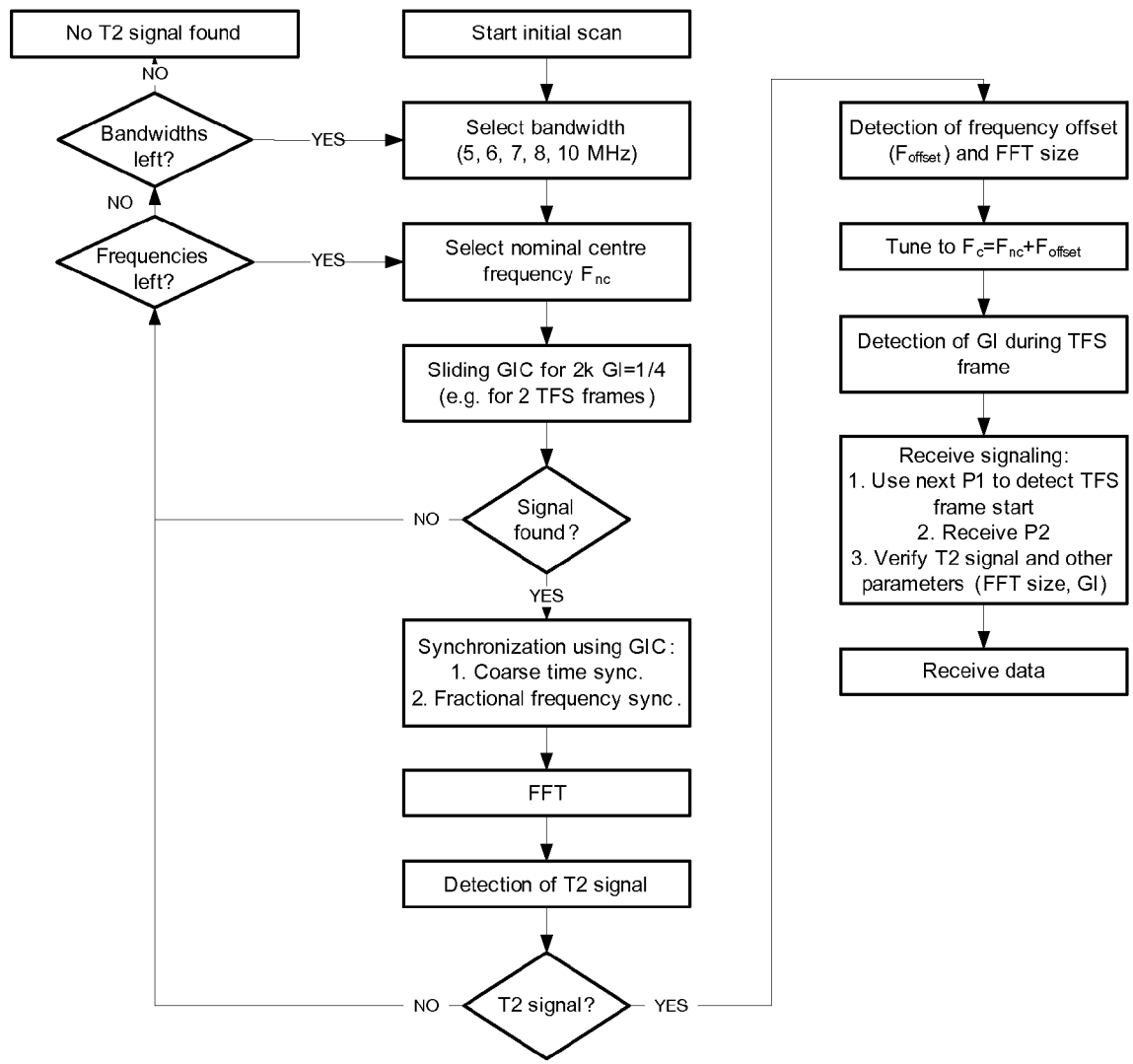
FIG. 22 is a flow diagram that shows steps that may be performed by a receiver in accordance with one or more embodiments.

FIG. 22 is a flow diagram that shows steps that may be performed by a receiver in accordance with one or more embodiments. In the initial scan, the receiver may be tuned to the nominal centre frequency of the channel, and it may start to look for the P1 symbol. The following procedure may then be repeated at selected channels (and bandwidths)—but not necessarily with every frequency offset since the P1 symbol may be detected at the nominal centre frequency regardless of the used offset.

The first task after bandwidth and nominal centre frequency selection is to find the existence of a T2-signal. The P1 symbol can be found, e.g., by guard interval correlation, which is immune to frequency offset. Using guard interval correlation helps also in T2-signal detection since the lack of a 2 k symbol implicates a non-T2 channel.

Guard interval correlation is intended for situations where the delay spread of the channel stays within the guard interval, which may not be the case with P1 symbol in large scale SFNs (e.g. with 32 k mode). In this case, delays longer than the guard interval—especially delays that are multiples of the useful symbol duration—produce false correlation.

It should be noted, however, that the symbol timing in presence of strong SFN echoes is not only a P1-specific problem because the receiver anyway should be able to synchronize to the correct path. The difference is that P1 correlation has higher noise level because of the shorter GIC window.

Coarse time and fractional frequency synchronization are obtained from the guard interval correlation. These are coarse estimates that are used for the P1 symbol itself, and they may be refined using the following symbols. It is assumed that these estimates are accurate enough to detect one of the five PRBS patterns to find the FFT-size.

For a fast initial scan, the channels that do not contain a T2-signal should be discarded relatively quickly. The preamble structure in accordance with embodiments supports a stepwise detection where the non-T2 channels can be discarded relatively quickly, and the detection of a T2-signal may be confirmed by reading the L1 static signalling.

First elimination may be done by the guard interval correlation. P1 signal may be repeated every frame (around 200 ms) and it is rather robust in terms of SNR requirements so testing two consecutive P1 positions may be reliable enough to detect the T2 signal. This would take around 500 ms per RF-channel. A receiver may then decide whether a possible P1 symbol has been found. If this is done over the 39 UHF-channels and even with 3 channel bandwidths, the total time used for the scan is approximately 58 seconds. Note that trying to scan different bandwidths at the same time does not really help as the channel rasters are different.

Once a possible P1 symbol has been found, the receiver may perform coarse synchronization and FFT. Next, the receiver may use the sparse carrier raster to differentiate between T2- and other 2k signals. Thus, the non-T2 signals can most likely be detected from the first received P1 symbol.

Detection of the frequency offset is based on finding the shifted pilot pattern. The detection of frequency offset and FFT-size may be separated by first using the power at the assumed pilot carriers to find the correct offset, and, after that, calculating the correlation to the five PRBSs. On the other hand, the PRBSs could be used already when finding the frequency offset. The sparse carrier raster decreases the complexity of the search algorithms.

After the frequency offset has been detected, the receiver can be tuned to receive the data symbols. Another task is to find out the used guard interval to decode the P2 symbol. As the P1 symbol does not carry any signalling information of the GI, the receiver may detect this by using the normal OFDM symbols during the frame. The P2 symbol immediately after the detected P1 can not be decoded. But there is enough time to detect the GI before the next frame as the whole 200 ms frame duration can be used. This adds another 200 ms to the signal acquisition time, but this happens most likely only with the FOUND T2-signals, not with every tested channel. As the maximum number of parallel multiplexes typically is in the order of 7 to 8, the total time added to the scan sequence is less than 2 s.

In case the frame duration is configurable, the frame synchronization can be obtained by recognising the next P1 symbol. The detected parameters from the L1 static signalling in the P2 symbols are then confirmed.

In one embodiment, the first P1 is used for a channel estimate, which is then used to equalize the second P1. This re-uses an underlying idea of various embodiments although the implementation is different. N refers to the FFT size.

In accordance with DVB-T2 standards, P1 and P2 symbols are presented as a solution for initial scan and transmission of signalling. In accordance with embodiments, differential modulation between two P1 symbols may have advantages in highly frequency selective channels.

As discussed above, the P1 symbols are used in the initial scan to: (1) detect the presence of T2 signal; (2) estimate the frequency offset; and (3) detect the used FFT size. A possible method estimating the frequency offset (and to some extent detecting the presence of T2 signal) is to use a frequency domain 'comb', i.e., use a subset of the available subcarriers in the OFDM symbol. Assume that there are a total of L subcarriers available (=FFT-size with guard bands deducted). Further, assume that every third subcarrier is available for this pilot/synchronization usage, so there will be $L'=\lfloor L/3 \rfloor+1$ active subcarriers for the synchronization signal. Mathematically, the comb may be represented with a sequence $P(0)$, $P(1), \ldots, P(L'-1)$ of bits. Here, the bit $P(k)$ tells, whether subcarrier number lowest+3*k contains a Binary Phase Shift Keying (BPSK) signal or not: '0' indicates a subcarrier containing no power, and '1' indicates a subcarrier containing a BPSK-modulated signal. The idea is that when the operator uses a channel frequency offset, the comb is shifted accordingly. Thus, after achieving timing synchronization and fractional frequency synchronization, the receiver may carry out FFT and search for the integer frequency offset. Here the receiver may use the received power at the presumed pilot carriers (i.e. the comb) and find the frequency offset without demodulating the pseudo random binary sequence. The correct integer frequency offset (=an integer multiple of subcarrier spacing) can then be detected by the presence of a relatively good match with the shifted comb and the measured subcarrier signal power. The FFT-size (selected from, for example, 5 choices) is then indicated by a selection of 5 BPSK-patterns $S_m(0), S_m(1), \ldots S_m(L'-1)$ for m=1, 2, 3, 4 or 5.

The frequency offset (after adjusting for its fractional part) amounts to adding a constant offset n to the subscripts. The sum $$S(n) = \sum_{k=0}^{L-1-n} P(k)P(k+n)$$

then computes the number of collisions between the comb and its shifted version, and S(0)=N equals the number N of subcarriers in the comb. For detection of the integer frequency offset to work, the collision counts S(n), n≠0 should be small in comparison to the correct match N.

Ideally, the structure of the P1-signals should be such that it supports other methods of detection as well, thereby providing hardware designers with freedom of choice. Another approach to the problem of detecting the presence of a P1-signal is based on time domain correlation. In order to support this alternative approach as well, the actual signals $$\sum_{k=0}^{L-1} P(k)S_m(k)\exp(2\pi j[f + (n+3k)\Delta f]t)$$

should have good cross-correlation properties—not only for distinct values of m but for distinct values of (m,n) pairs, i.e., for different values of the (FFT-size, frequency offset) combinations.

Other properties required by the set of signals are reasonable time domain autocorrelation properties and reasonable peak-to-average-power ratio (PAPR) properties. Ideally, it should also be possible to quickly and efficiently regenerate both the comb and the BPSK-sequences without resorting to large look-up tables.

Embodiments are directed to: 1) combs limited to every third subcarrier, and 2) combs that contain approximately one half of the remaining subcarriers, so the number of active subcarriers N should be approximately L/6. With these assumptions in place, shorter comb patterns/sequences of length $L'=\lfloor L/3 \rfloor+1$ are of interest.

In accordance with embodiments, a binary m-sequence of a suitable length is used to generate the comb, and selected cyclic shifts of the same m-sequence (now interpreted as +1/−1 as opposed to 0/1) are used to generate 5 BPSK-patterns.

Six bit patterns, each consisting of r bits, not all zero, which are hereafter referred to as the seeds, are specified. The seeds are then extended into a sequence of length $2^r-1$ by applying a recurrence formula determined by a primitive polynomial of degree r. Note that the same recurrence formula is applied to form each of the 6 sequences. One of the sequences is singled out to determine the comb, and the other 5 determine the BPSK-patterns by reinterpreting '0' as +1 and '1' as −1. Ideally, then $L'=2^r-1$. Different use cases, and an alternative method for constructing the comb, may also be used.

In the specific use case of DVB-T2, L=1531 subcarriers, $L'=511=2^9-1$, r=9, and the primitive feedback polynomial $1+x^4+x^9$ may be used. An example set of seeds consists of 100 000 000 for the comb, and 000 110 101, 110 001 100, 101 111 101, 101 101 111, 111 100 111 (all interpreted as +/−1 s) for the 5 BPSK-patterns. These are extended to sequences P, and $S_m$ for m=1, 2, 3, 4 and 5 by repeated applications of the recurrence formulas P(k)=P(k−4)+P(k−9) (mod2) and $S_m(k)= S_m(k-4)*S_m(k-9)$ for k=9, 10, . . . , 510.

A design criterion in the selection of the seeds is that, while the resulting sequences are cyclic shifts of one another, the amount of shift that it takes to get from one to another should be made relatively large. Similarly, the seeds may be designed such that one of them cannot be produced from the bitwise XOR of the comb sequence and another sequence by a short (e.g., less than 45 positions) cyclic shift.

If the number of available carriers L' is not of the form $2^r-1$, but is still relatively close to such a number, then the comb and the sequences may be shortened by truncating a small segment off the tail end of the m-sequences, or the pattern may be extended by cyclically repeating it for a relatively short time. In the above example, the number of subcarriers may be reduced from 1531 to 1507 by cyclically shifting the comb pattern as well as the BPSK-sequences by one position. To achieve this, the 9 bit seeds may be extended to 10 bits by applying the recurrence relation once. After that, the first bit may be left out thereby producing a 9 bit seed. Thus, the seed 000 000 001 for the comb, and the seeds 001 101 010, 100 011 000, 011 111 010, 011 011 110, 111 001 111 for the BPSK-sequences would be used instead of the above suggestions. Then, the comb will begin with 8 zeros, i.e. 24 empty subcarriers, and the P1-signal is narrowed down to 1507 consecutive carriers. Observe that the role played by the available bandwidth is less important, as in a narrower band (e.g. 5 MHz) application the spacing between subcarriers is also narrower, and there is still room for roughly the same number of subcarriers.

An alternative method of generating a frequency domain comb is to use the quadratic residue sequences (=QR-sequences), which are known in the art. The resulting comb shares the collision statistics between shifted versions with the m-sequence based comb. This alternative method has the advantage that the length of a QR-sequence is a prime number p congruent to 3 modulo 4. Thus, the set of available lengths is more flexible when QR-sequences are used. Cyclically shifted versions of the same sequence can be used also here for constructing the BPSK-sequences. However, generating a relatively long QR-sequence on the fly is computationally more taxing, and in practice a relatively large look up table may have to be used.

In accordance with at least one embodiment, the proposed 5 P1-signals are $$P1_m(t) = \sum_{k=0}^{510} P(k)S_m(k)\exp(2\pi j[f + (n + 3k)\Delta f]t),$$

for m=1, 2, 3, 4 and 5. Here n denotes the integer part of the frequency offset. It is counted as a multiple of subcarrier spacing, so in the proposed use case n=±37,±75,±112 correspond to frequency offsets of ±⅙,±⅓,±½ MHz (note that fractions of subcarrier spacing are handled earlier irrespective of whether they are a result of a rounding error here or a result of a clock discrepancy between the receiver and the transmitter). But the presented construction actually allows any integer values of n up to 134. Here P and $S_m$ for m=1, 2, 3, 4 and 5, are the sequences of length 511 discussed above. These signals occupy 256 subcarriers within a range of 1531 consecutive subcarriers.

There are various other choices for the seeds that work equally well. For example, each of the 6 m-sequences may be cyclically shifted by the same amount without changing the correlation properties. The example values of seeds work well, when the integer part n of the frequency offset is less than 3*45=135. Within that range the cross-correlations among the offset versions of the sequences remain low. A computer search has revealed other sets of seeds with equally good performance. The possibility of an even slightly wider range of low correlation has not been fully excluded, but it is known that if n might be as large as 3*51=153, such a low correlation range cannot be achieved with this method, no matter how carefully the seeds are selected.

The spacing in multiples of 3 allows the integer part of the frequency offset to be detected relatively quickly as there are no collisions between the true comb and the tested version, unless the difference between the tested and the actual integer offsets is a multiple of 3. If that condition is satisfied, then the number of collisions is 256, when we have the correct offset, and the number of collisions is in the range 119 . . . 128 otherwise, i.e. near the optimal pseudorandom half-way point of 128. For a randomly generated comb with a similar structure (=limited to every third subcarrier) and density (=altogether one out of 6 subcarriers in the average is 'active'), the expected range (+/−2 standard deviations from the expected value) for the number of collisions is from 104 to 144, so the use of m-sequences improves this by bringing the variation into a narrower range.

The underlying algebraic structure of the m-sequences helps ensure that nearly all the sequences produced in this manner have reasonably good PAPR-properties (the exception is to use the same seed for the comb and one of the sequences) and reasonably good time domain autocorrelations. The careful choice of the seeds further helps ensure good cross-correlation properties among the offset version of the various sequences. Indeed, the non-trivial correlations are very close to zero as opposed to randomly fluctuating up to +/−2SD level of 32.

Figure 23:
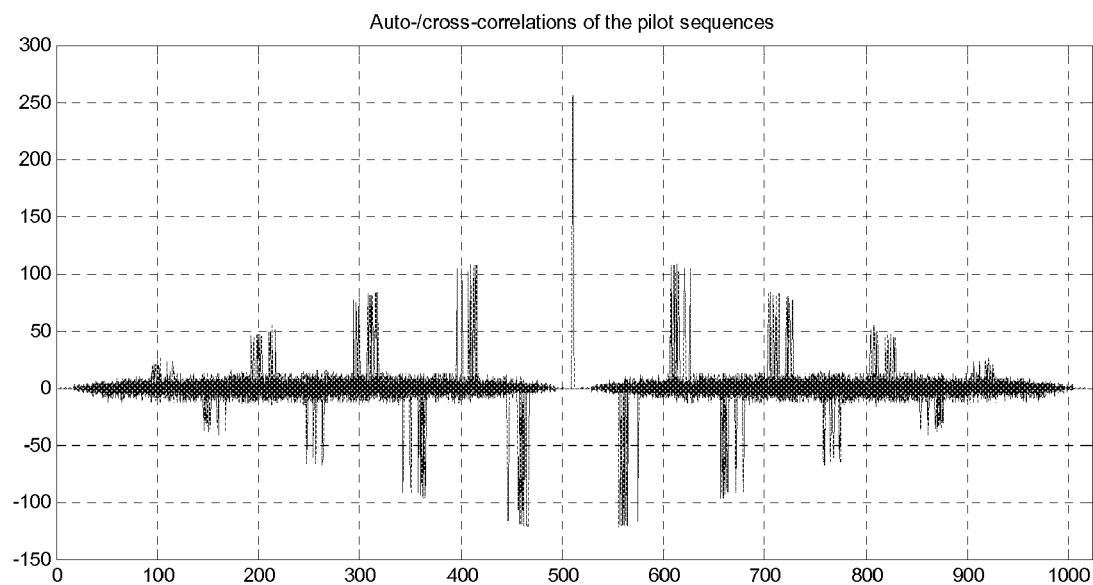
FIG. 23 is a graph of auto/cross-correlations between pilot sequences and their frequency offset versions in accordance with one or more embodiments.

FIG. 23 is a graph of auto/cross-correlations between pilot sequences and their frequency offset versions in accordance with one or more embodiments.

Figure 24:
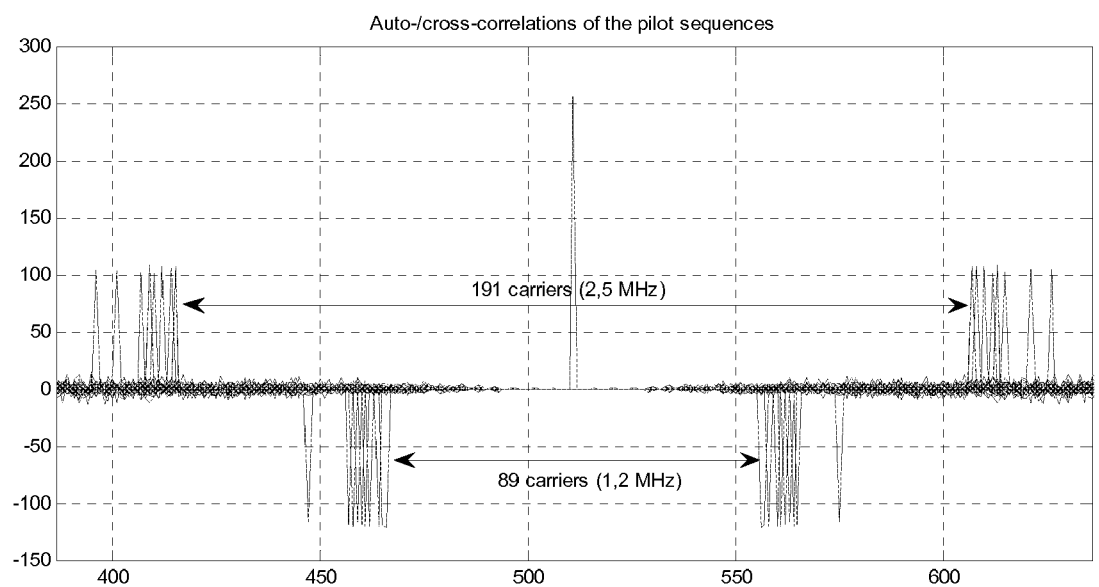
FIG. 24 is a zoomed in version of the graph of FIG. 23 showing the low cross-correlation range of frequency offsets.

FIG. 24 is a zoomed in version of the graph of FIG. 23 showing the low cross-correlation range of frequency offsets.

Figure 25:
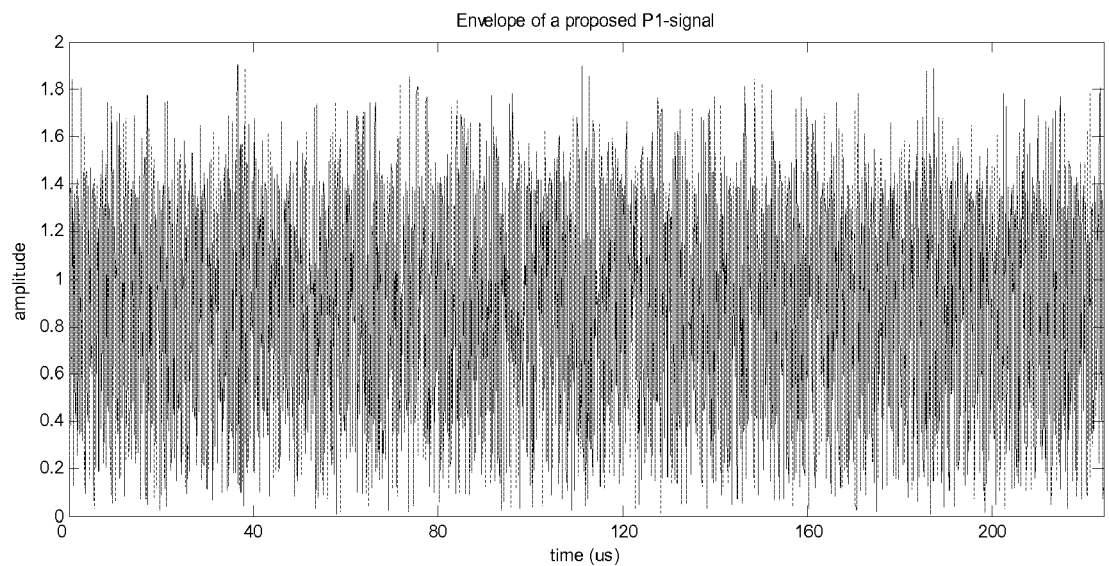
FIG. 25 is a graph that shows the envelope amplitude of a first pilot symbol signal in accordance with at least one embodiment.

FIG. 25 is a graph that shows the envelope amplitude of a first P1-signal (a single symbol computed with a central frequency of 666 MHz, and carrier spacing of 4464 Hz, sampled at 25 MHz to produce these figures) in accordance with at least one embodiment. The scale is chosen so that the mean square amplitude equals one.

Figure 26:
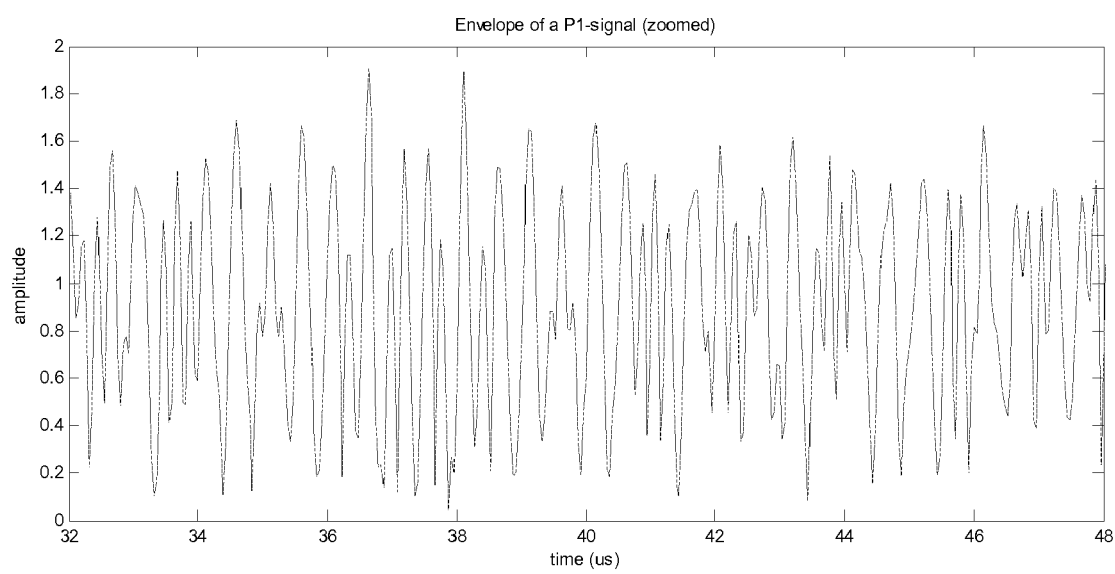
FIG. 26 is a zoomed in version of the graph of FIG. 25.

FIG. 26 is a zoomed in version of the graph of FIG. 25. Together FIGS. 25 and 26 show the reasonable PAPR-properties of the set.

In the discussion of the BPSK and P1 sequences that follows, F=GF(512) will denote the finite field of 512 elements, and g will be a primitive element of F that satisfies the equation $1+g^5+g^9=0$, so the powers $g^i$ go through the non-zero elements of F, as the exponent i takes the values i=0, 1, ..., 510. We further note that will then be a root of the earlier feedback equation $1+x^4+x^9=0$. Let tr:F→GF(2) be the trace function. The previous 0/1-valued m-sequence and all its cyclic shifts are gotten as the sequences $m_\alpha = tr(\alpha g^{i-1})$ for i=1, 2, ..., 511 and $\alpha \neq 0$. We write $e(x)=(-1)^{tr(x)}$ and $\omega = e^{2\pi j/511}$. Thus, we can select elements $\alpha \in F$ and $\beta_j \in F$, j=1, 2, 3, 4, 5 such that the comb of zeros and ones is gotten as $P(i) = tr(\alpha g^{i-1}) = (1-e(\alpha g^{i-1}))/2$, and that the BPSK-sequences are gotten as $S_j(i) = e(\beta_j g^{i-1})$. The P1-sequences are thus given by the formula $P1_{j(i)} = (1-e(\alpha g^{i-1})) e(\beta_j g^{i-1})/2$.

We have the identity $e(x \pm y) = e(x) \cdot e(y)$ and sums $$S(\gamma) = \sum_{x \in F} e(\gamma x) = 0$$

(hereafter referred to as equation (1) or sum (1)), whenever $\gamma$ is non-zero, and the so called Gauss' sums $$S(k, \gamma) = \sum_{i=0}^{510} e(\gamma g^i) \omega^{kj}$$

(hereafter referred to as equation (2) or sum (2)) that have complex absolute value $\sqrt{512}$ when both $\gamma$ and k are non-zero, and less than that when one but not both of them is zero.

At this point we record that the proposed comb corresponds to the choice $\alpha=1$ Let us consider the number of collisions between the pattern $P(k)=(1-e(\alpha g^k))/2$ and its shifted version $P(k+n)$, where n indicates the shifted amount (at most $\lfloor 112/3 \rfloor = 37$). If we were to continue the pattern of this comb cyclically with a period of 511, then the number of collisions may be computed. Denote the variable $x = g^k$, and adopt the usual convention that F* is the set of non-zero elements in the field F. Then the number of 'collisions modulo 511' is (so k+n is computed modulo 511)

$$\sum_{k=1}^{511} P(k) P(k+n) = $$

$$\frac{1}{4} \left( \sum_{x \in F^*} 1 - \sum_{x \in F^*} e(\alpha x) - \sum_{x \in F^*} e(\alpha g^n x) + \sum_{x \in F^*} e(\alpha(1+g^n)x) \right).$$

Here the first sum is 511. Because t<511, the coefficients $\alpha, \alpha g^n, \alpha(1+g^n)$ are non-zero, and equation (1) tells us that the remaining sums are all equal to −1 (adjusting for the fact that the term e(0)=1 is missing from the sums). Altogether we get that the shifted comb has 512/4=128 collision with the cyclically extended comb. When we take the tail effects due to the sum k+n overflowing >511 into account, we see an expected drop on the number of collisions. At n=1, 2, 3, 4, 6, 7, 8 there are 128 collisions, and this number drops approximately linearly as n grows. When n reaches the maximum value of 37, the number of collisions is 125. The lowest value of 119 collisions is reached with offset n=36. So with this comb the number of collisions between two offset combs will be close to the ideal midway point of 128.

We can compute the cross-correlation between two P1-sequences (in the f-domain, as per Parseval's theorem it doesn't matter whether this is done in the frequency or time domain) as $$\langle P1_j, P1_{j'} \rangle = \frac{1}{2} \sum_{i=0}^{510} (1-e(\alpha g^i)) e((\beta_j - \beta_{j'}) g^i)$$

$$= \frac{1}{2} \left( \sum_{x \in F} e((\beta_j - \beta_{j'})x) - \sum_{x \in F} e((\alpha + \beta_j - \beta_{j'})x) \right),$$

so the sum (1) tells us that this cross-correlation is equal to zero, provided that $\beta_j - \beta_{j'}$ is non-zero (in other words, the two sequences are different) and that $\alpha + \beta_j - \beta_{j'}$ is non-zero (in other words, the two sequences are not bitwise complements of each other). A practical test for this is that for two sequences of this type to be orthogonal, their initial segments are different from each other, and that the bitwise XOR of their initial segments differ from the initial segment of the comb P.

As in the computation of the number of collisions, we first extended the sequence cyclically in the f-domain, compute the cross-correlation between such an extended pair of signals, and more or less ignore the short 'tail', which is the sum of a handful pseudorandom terms, and will not contribute much. So the (f-domain) cross-correlation between a P1-signal and another P1-signal offset by t positions from the former is $$\langle P1_j, P1_{j'} (\text{offset by } n) \rangle = \frac{1}{4} \sum_{i=0}^{510} (1-e(\alpha g^i)) e(\beta_j g^i)$$

$$(1-e(\alpha g^{i+n})) e(\beta_{j'} g^{i-n})$$

$$= \frac{1}{4} \left( \sum_{x \in F} e([\beta_j - g^n \beta_{j'}]x) - \right.$$

$$\sum_{x \in F} e([\beta_j - g^n(\alpha + \beta_{j'})]x) +$$

$$\left. \sum_{x \in F} e([\alpha + \beta_j) - g^n(\alpha + \beta_{j'})]x) \right)$$

(hereafter referred to as equation (3)).

Observe that here the indices j and j' may be equal, i.e., we are also interested in the correlation between a sequence and its offset version. From equation (1), we see that this main term is zero, unless one of the coefficients in square brackets is zero. As n takes values in a range about zero, we are left with the goal of selecting the coefficients $\beta_1, \ldots, \beta_5$ in such a way that the base g discrete logarithms of the coefficients themselves, and also of the sums $\alpha + \beta_1, \ldots, \alpha + \beta_5$ are as far from each other as possible (cyclically modulo 511). As there are 10 field elements here altogether the minimum separation among the discrete logarithms cannot be higher than $\lfloor 511/10 \rfloor = 51$. With the choice $\alpha = 1 = g^0$ of the sample construction a small heuristic search gave the set used in the discussion above: $\beta_1 = g^{33}$, $\alpha + \beta_1 = g^{181}$, $\beta_2 = g^{135}$, $\alpha + \beta_2 = g^{499}$, $\beta_3 = g^{245}$, $\alpha + \beta_3 = g^{398}$, $\beta_4 = g^{349}$, $\alpha + \beta_4 = g^{85}$, $\beta_5 = g^{445}$, $\alpha + \beta_5 = g^{296}$. Here the discrete logarithms form a list {33, 135, 245, 349, 445, 181, 499, 398, 85, 296}—the first five discrete logarithms specify the elements $\beta_1, \ldots \beta_5$, and the last five list the discrete logarithms of the elements $\alpha + \beta_1, \ldots, \alpha + \beta_5$. The smallest cyclic separation of 45 is here between 499 and 33, as 33−499+511=45. Another sequence of discrete logarithms that also has the smallest cyclic separation of 45 is {33, 135, 233, 339, 447, 181, 499, 388, 286, 80}. It is unknown, whether there are choices leading to an even larger cyclic separation. As 3*45=135 (subcarrier separations) is larger than 112, this suffices for our purposes.

Figure 28:
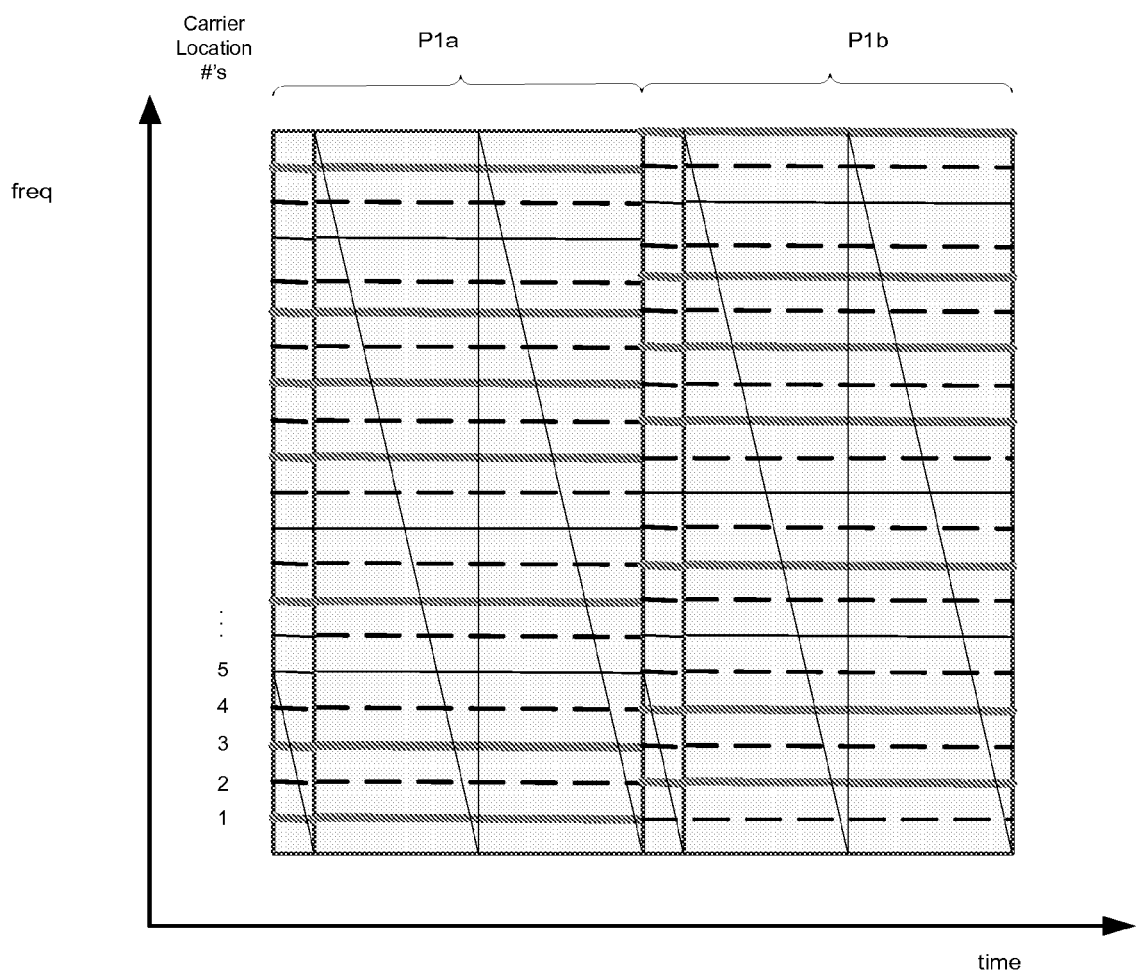
FIG. 28 shows a synchronization symbol P1 having two consecutive OFDM symbols (P1$a$, and P1$b$) that have the same FFT size in accordance with an embodiment.

These numbers explain the gaps in FIG. 23. There are no matches with offsets up to 44 in either direction, so the width of the near-zero zone in FIG. 28 is 2*44+1=89 carriers. We note that the separation 45 corresponds to the terms with a minus sign in equation (3). The smallest cyclic separation corresponding to a term with a plus sign is 96, and it occurs between the pairs (445, 349) and (181, 85). This explains why the nearest sidelobes are all negative, and also explains the wider gap of 2*96+1=193 carriers above the x-axis.

Here we show how the bound $$S(k, \gamma) = \sum_{i=0}^{510} e(\gamma g^i)\omega^{kj}$$

means that the auto-correlation of the proposed signals remains at a low level at least for a certain discrete set time displacements. The time domain version of the proposed P1-signal is $$P1_j(t) = K \sum_k P1_j(k) e^{2\pi i(f + k \cdot \Delta f)t},$$

where for convenience we may include the frequency offset into f, and let $\Delta f$ be the spacing between two possible carriers of the P1-signal (=3 times the subcarrier spacing of the 2k OFDM-symbol). Assume that we have a time error $\Delta t$ that is less than the guard interval. Then the time domain correlator sees $$\langle P1_j(t), P1_j(t+\Delta t) \rangle = K^2 \int_{period} \sum_k \sum_{k'} P1_j(k) P1_j(k')$$
$$e^{2\pi i(f+k\cdot\Delta f)t} e^{-2\pi i(f+k'\cdot\Delta f)(t+\Delta t)} dt$$
$$= K' e^{-2\pi i f \Delta t} \sum_k P1_j(k)^2 e^{2\pi i k(\Delta f \cdot \Delta t)}$$

(hereafter referred to as equation (4)).

Here the coefficients K and K' are there for normalization and contain the power boosting as well as the constants coming from DFT and the integration. The absolute value of this term depends thus (up to scaling) only on the sum. Assume that $\Delta t$ has such a magnitude that the product $\Delta f \Delta t = n/511$, for some integer n. That is, the time error is an integer multiple of 1/511 of the common period of the subcarriers. So we can write $e^{2\pi j k(\Delta f \cdot \Delta t)} = \omega^{nk}$. Taking into account the fact that $P1_{j(k+1)} = (1 - e(\alpha g)^k)/2$ only depends on the pattern of the comb (and not at all on the BPSK-modulation) we see that at these values of the time error the cross-correlation equals $$\langle P1_j(t), P1_{j'}(t+n/(511\cdot\Delta f)) \rangle = K'' \sum_{k=0}^{510} (1 - e(\alpha g^k))\omega^{nk}.$$

(hereafter referred to as equation (5)).

The sums in equations (1) and (2) then tell us that (forgetting the multiplier K″—its absolute value is independent of n) this sum has the value 256, when n=0 (i.e. when there is no timing error) and has absolute value $\sqrt{512} \approx 22.6$ otherwise. To summarize: with our signals there is a relatively dense discrete set of time errors that will lead to auto-correlations values about 10 dB below the synchronized value. While this is not conclusive, it is highly suggestive that the auto-correlation properties of our proposed signals are relatively good.

Again the sums (1) and (2) are central to our estimate. When we compare two different P1-signals $P1_j$ and $P1_{j'}$, the computation that lead to equations (4) and (5) above will this time yield $$\langle P1_j(t), P1_{j'}(t+n/(511\cdot\Delta f)) \rangle = K'' \sum_{k=0}^{510} (1 - e(\alpha g^k))e((\beta_j - \beta_{j'})g^k)\omega^{nk}.$$

Recall that we work under the assumption that $\beta_j - \beta_{j'} \neq \alpha$. If here n=0, then this sum evaluates to 0 by formula (1), and otherwise we have here two Gauss' sums, so by the triangle inequality we can estimate $|\langle P1_j(t), P1_{j'}(t+n/(511\cdot\Delta f))\rangle| \leq 2K'' \sqrt{512}$. In other words, at this discrete set of time errors the cross correlations are at least 7 db below the perfect match of 256*K″.

Again the sum (2) allows us to give a relatively sharp estimate of the envelope power at the sampling instants $\Delta t = n/(511\Delta f)$ for all n=0, 1, . . . , 510. We have $$|P1_j(n/511\cdot\Delta f))| = \frac{1}{\sqrt{2048}} \left| \sum_{k=0}^{510} (1 - e(\alpha g^k))e(\beta_j g^k)\omega^{kn} \right|.$$

As $\alpha \neq \beta_j$ we get zero at n=0, and by the result of equation (2) on Gauss' sums, the sum in absolute value signs is upper bounded by $2\sqrt{512}$. Altogether the sampled envelope power is thus at most 1. Here the total signal energy is 256, so the mean power is $\sqrt{256/2048} = 1/\sqrt{8}$. Thus at this (Nyquist) sampling rate the maximum to mean envelope power ratio is at most $\sqrt{8}$. There is a general bound that tells us that the continuous peak-to-mean-envelope-power-ratio is then at most $(2 \ln(511) + 1.132 + 4/511)\sqrt{8}$ in the worst case (and in practice most likely quite a bit better).

As discussed above, relatively fast recognition and synchronization of OFDM signals may be achieved by using special synchronization signals or specifically designed symbols, in accordance with various embodiments. For example, the P1 symbol may be defined to be a predetermined, e.g., 2k OFDM symbol, with a special structure using relatively sparsely allocated carriers (e.g., every third position is allowed, as discussed above).

A potential issue with this approach is that, under certain multipath conditions, the energy of the synchronization symbol may be significantly reduced, specifically on the selected active carriers. For example, if there is a two-path channel with 0 dB strength, and with delay that is ⅓ of the OFDM symbol length (useful part without guard interval), then every third carrier will be significantly cancelled. With a proper, unfortunate, phasing these cancellations may occur on the selected active carrier locations. The cancellation will be partial but could still be potentially harmful.

Another potential issue is a continuous wave interference. This could also be difficult to handle with the approach set forth above.

Other approaches for synchronization symbols, like having a longer sequence of known waveforms (like sinusoids) or pseudorandom codes, have been used in the past. The main drawback of such approaches is that they normally use fairly long time periods and, hence, are relatively inefficient. Data capacity is reduced. Also, a short training/synchronization period is beneficial in mobile channels. Then the channel can remain roughly constant during the synchronization symbol, which increases the synchronization detection performance.

Embodiments use fairly short symbols (like 2k or 1k symbols in DVB case), well defined in the frequency domain, including sparsely distributed carriers in pseudorandom locations, with relatively robust modulation (like Binary Phase Shift Keying (BPSK) or Quadrature Phase Shift Keying (QPSK)). In addition, embodiments may use two consecutive short OFDM symbols, both carrying sparse active ("pilot") carriers, with the second symbol having the active carrier locations shifted by a predetermined amount in frequency. For implementation reasons, the shift may, in one embodiment, be one carrier interval of the OFDM symbol. An embodiment takes advantage of the fact that only carrier locations which are taken from a regular structure (every second, every third or the like) are allowed. The active carriers have been distributed (pseudo)randomly on those locations. This leads to a regular structure in the time domain (known Fast Fourier Transform (FFT) sampling property): if every $n^{th}$ carrier location is allowed, these positions may or may not have an active carrier, (other carriers being zero), then the OFDM symbol will have n identical consecutive parts in the time domain.

Figure 27:
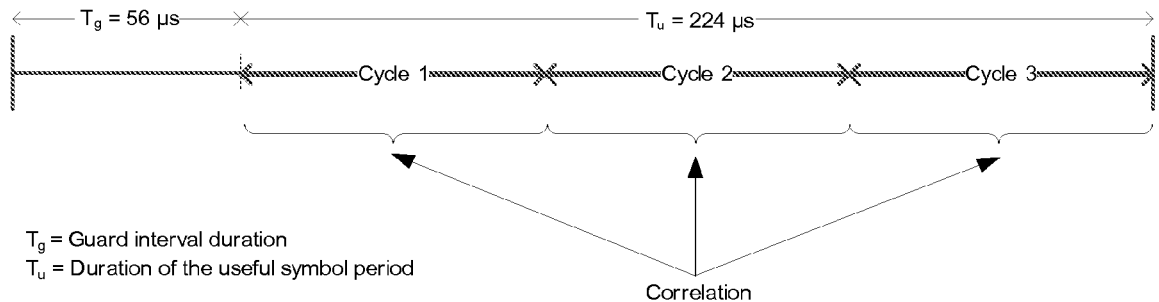
FIG. 27 shows an example of a 2k symbol (P) symbol, in accordance with an embodiment.

FIG. 27 shows an example of a 2k symbol (P1) symbol, in accordance with an embodiment, with length $T_u$ 224 μs and with a guard interval of length $T_g$, which is ¼ of the useful symbol length $T_u$. Ts, which is not shown in FIG. 27 refers to the OFDM symbol length=Tu+Tg. Carrier locations are taken from a raster of every third leading to periodicity of 3 in the useful signal part.

The periodicity shown in FIG. 27 can be used to detect the signal efficiently and reliably. The receiver may take a correlation between cycle one and two to detect the signal existence. Note that in normal data carrying OFDM symbols these correlations would be small—near zero. Detection robustness may be increased by taking multiple simultaneous correlations, e.g., take, in addition, correlation between cycle one and cycle three. It is possible to also add a correlation between cycle 2 and cycle 3 for additional reliability.

Earlier solutions tend to rely on guard interval correlation (GIC) as the data in the guard interval (cyclic prefix) is the same as the data at the end of the useful symbol (end of cycle 3 in the example above). In accordance with embodiments, though, more signal energy is available in correlation, and it is possible to use several simultaneous correlations over various parts of the signal that gives tolerance towards interference and noise. In addition, a correlation between the guard interval and any of the n sections may also be performed.

In an additional aspect, some carrying of information may be included into the synchronization symbol. One possibility is to use a known BPSK (or QPSK) sequence in the OFDM symbols. The sequence may be one of a set of few sequences. These sequences may be the same or different for the first and second pulses. These sequences are correlated in the receiver against known sequences to determine which one was sent and, hence, a few bits of information may be carried. For instance, if the number of BPSK possible sequence combinations is 8 then 3 bits may be carried.

A modification is that the sequence in symbol one may be used as a reference. So the sequence in the first pilot symbol (P1a) is known to the receiver in advance. The second pilot symbol could then have, say, m possible sequences. The sequence in the symbol P1a is used as a rough channel estimate for the symbol P1b. The receiver decides which sequence was sent in P1b based on the phase information it got from the first symbol. Again, 1d(m) (i.e., $\log_2(m)$) bits are conveyed.

A further modification is that the information in sequence P1b may be coded using differential modulation so that the coded value in the sequence in P1b is given by the phase difference as compared to the phase value in the corresponding carrier position in the sequence in P1a. Typically this phase difference is 0 or 180 degrees in Differential Binary Phase Shift Keying (DBPSK). Differential Quadrature Phase Shift Keying (DQPSK) may also be used.

In accordance with embodiments, a receiver may take advantage of the periodicity that results from the sparse subsampling. The receiver may make frequency translations in several (i.e., two or more) subsections of the received pulses, as is discussed in more detail below.

In accordance with embodiments, a transmitter may include synchronization signals into the transmitted signal. One beneficial implementation form is that the synchronization signal has a determined form using a fixed size of FFT (e.g. 1k in DVB-T2/H2). The data carrying OFDM symbols following the synchronization symbols (there may be some other synchronization signals also) could be of different form having different FFT size, symbol length, guard intervals (GI), modulation etc. This preferred structure of the synchronization symbol will be described later. Second, the receiver could use the properties of the synchronization symbol in various ways.

Some innovative receiver algorithms will also be described.

The robustness of synchronization symbol P1 may be increased by dividing it into two parts, P1a and P1b, where both parts are 1k FFT symbols with relatively small guard intervals (GI) (like 1/16) or even without any GI. Short guard intervals are enough because, in any case, the detection must be based on robustness of P1, and we cannot have long enough GIs to avoid Intersymbol interference (ISI). But boosting of carriers in P1 counteracts this. The boosting results from the fact that only a relatively low number of active carriers are used. In one embodiment, a suitable value could be that, on average, every $6^{th}$ carrier is used. For 1k FFT, this would mean on the order of 128 pseudorandomly located active carriers. These active carriers may be taken from a raster where every nth carrier location is allowed, where n is a relatively small number, such as, 2, 3, 4, 5, or the like. The rest of the carriers may have zero value.

FIG. 28 shows a synchronization symbol P1 having two consecutive OFDM symbols (P1a, and P1b) that have the same FFT size in accordance with an embodiment. The active carrier locations are depicted by wide solid lines in FIG. 28. As shown in FIG. 28, the active carrier locations in P1b are shifted in frequency relative to the active carrier locations in P1a. Narrow solid horizontal lines in FIG. 28 represent allowed carrier locations of the FFT symbol, and the dashed horizontal lines represent forbidden carrier locations.

The location of the active carriers of the second part (P1b) would be shifted by some amount in frequency, in one embodiment, by one carrier location as compared to the first part P1a. This would give the benefit of not getting interference from P1a to P1b as the spill-over (due to multipath propagation) from P1a would fall on the unused carrier locations in P1b. Carrier locations 1-5 are labeled in FIG. 28. Carrier locations 1, 3, 5, . . . are referred to as odd numbered carrier locations and carrier locations 2, 4, 6, . . . are referred to as even numbered carrier locations.

A few embodiments using examples for DVB-T2/H2 will now be provided. In a first example, for robustness reasons, the structure of P1a could be: 1k FFT, GI length Tg=1/16*Tu (corresponds to 64 samples). Basic raster for 128 carriers is 1/2, non-uniform pseudorandom pattern, active carriers would have pseudorandom BPSK coding average 1/6 (e.g. only even carriers used). P1b could be otherwise similar but the locations shifted by one, i.e., only odd carrier locations used. The BPSK sequence could be the same as, or different from, that in P1a. Various uncorrelated BPSK sequences may be used to indicate, e.g., the FFT size of the later coming data symbols or some other useful parameters.

Additionally, in another aspect, the BPSK sequences in P1a and P1b could be selected so that the sequence in the first symbol P1a would remain the same (and be known to the receiver). The extra information may be coded into the selection of the BPSK sequence of the second symbol P1b. The active carriers in the first symbol may then serve as pilot values for the second symbol. As the symbol length is assumed to be short relative to the channel variations, the channel may be assumed to remain roughly unchanged for the time of the second symbol. Also, as the frequency shift is one carrier interval (or some other small number), the channel phase may change by a relatively small amount from P1a to P1b (in the corresponding locations). So for BPSK signals, the phase information would be close enough for fairly reliable detection (as this is based on correlations over 128 carriers).

In a second DVB-T2/H2 example, as the sync symbol P1 is robust due to the active carrier boosting (the average power may be the same as in the actual data symbols), guard intervals may be omitted. So it would be possible to use the following structure: P1a: 1 k FFT, 0 GI, 128 active carriers, pseudorandomly located, using only even carrier locations, BPSK modulated by a random sequence. P1b: same as P1a but active carrier locations shifted up or down in frequency by one carrier frequency interval, i.e., using only odd carrier locations, if the P1a uses even carrier locations. The FFT size information of the data symbols may be coded into the selection of the BPSK sequences. There may be, e.g., 5 or 6 different sequences that should be maximally differing from each other. The definition of these sequences could happen using normal coding reasoning—maximizing the Hamming distance between the sequences.

In a third DVB-T2/H2 example, the pulse structure is the same as in the second example, but short guard intervals (like 1/16) are used in both parts P1a and P1b.

Receiver algorithms in accordance with embodiments will now be discussed. The pulse structure of P1, as described above, lends itself to various detection algorithms. At least the following information may be extracted from such a pulse structure: the existence of DVB-T2/H2 (or any other defined system) signal. As the signal has unique features in the time domain (periodicity of n) and in the frequency domain (due to the known BPSK sequence), the pilot symbol can be reliably detected with a relatively low probability of false detection.

Coarse timing of the signal may be obtained. The correlation properties of P1 give a good candidate for correct timing. The multiple correlations and/or utilization of most of the signal energy in correlation make this reliable.

An estimate of the multipath channel delay profile may be obtained. The time correlation properties also give the rough structure of the multipath channel. Specifically for SFN networks, this could be used to estimate the difference of the delay extremes in the multipath profile (useful in locating the FFT window position for detecting the useful data).

An estimate of the frequency offset of the signal may be obtained. This is based on the FFT on the first symbol P1a and/or the second symbol P1b. Correlating, for example, the received powers on carriers with the known active carrier locations, the offset could be solved.

Small amount of information coded into the selection of BPSK sequences may be conveyed (two methods as described above). For example, FFT size of the useful data symbols in the frame could be signalled.

For detection, half symbol correlation may be used and, preferably, for P1a and P1b simultaneously.

Carrier offset may be solved by taking 1 k FFT over P1a and/or P1b (P1b could be used for extra robustness). Correlation with the known candidate BPSK patterns would solve FFT size of the useful data.

For SFN, a delay value of 1/2 of the 1 k symbol length could create partial elimination of symbol P1a, for example. However, in that case the symbol P1b would be unaffected (the delayed component adding constructively). In principle, delay value of 1 symbol length could create nulls for each 1 k carrier (for continuous sinusoids) but then it would be harmless as the delayed interference would fall outside the useful symbol period. So, consequently, delay values would not create notable problems.

Aspects of an example receiver algorithm will now be discussed. For the special case of the second and third examples above, it is worth noting that P1b is a transformed version of P1a. So if the receiver would translate pulse P1b by the known amount in frequency, then P1a and P1b would be the same. That would mean that correlations could be taken over P1a and the frequency translated version of P1b (even with the guard interval included). That might be beneficial to counteract some interference like a CW interference on one frequency. The frequency translation would mean that such interference would practically be divided into two parts that differ in frequency. The correlation of such signals would then be near zero and P1 could be detected reliably without significant influence from the interference.

Another aspect of an example possible receiver algorithm works in cases like examples 2 and 3 above where the BPSK (or QPSK) sequences in P1a and P1b are the same.

Figure 29:
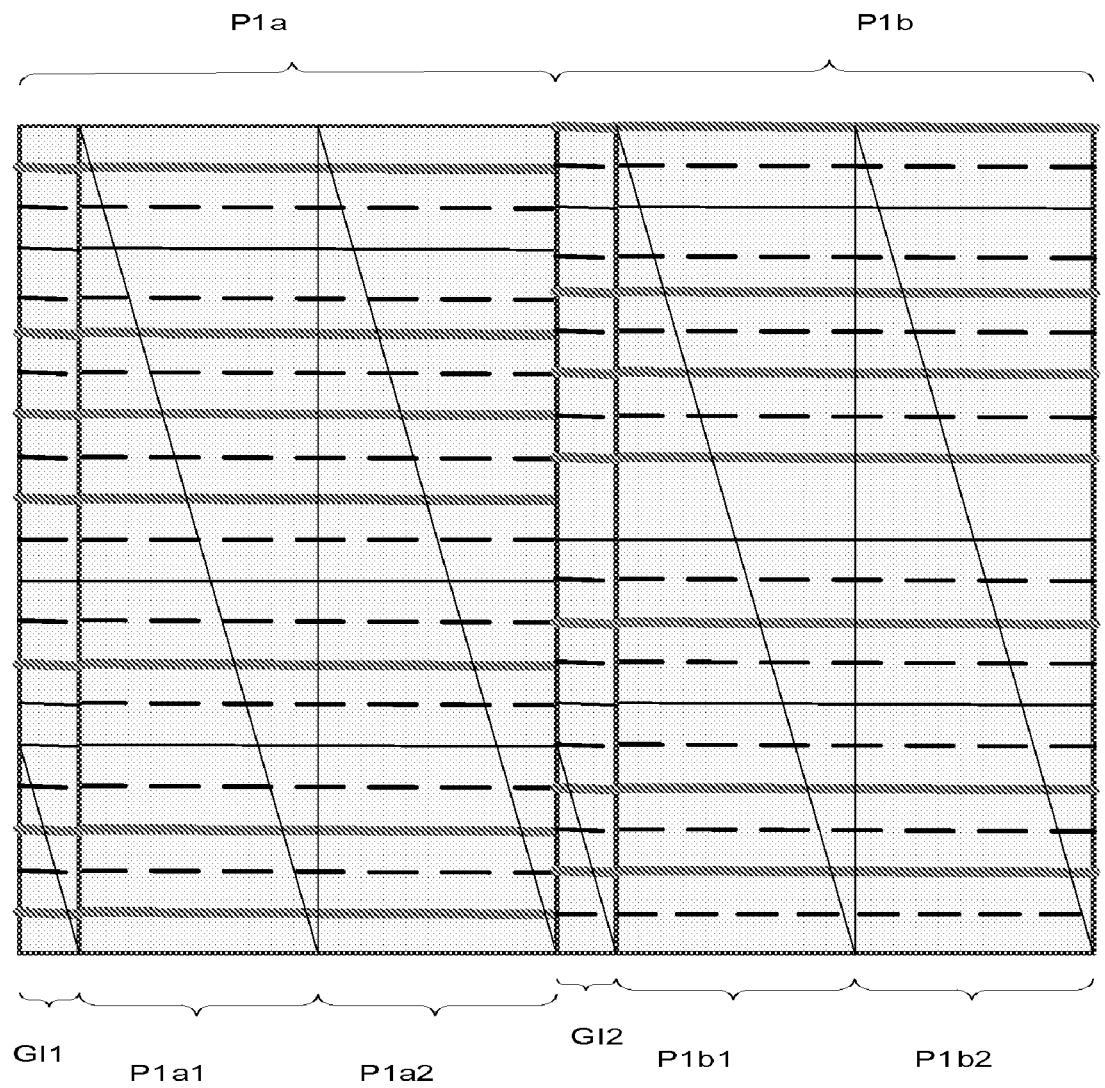
FIG. 29 shows an example of P1 in which pulses P1$a$ and P1$b$ have each been subdivided into two parts in accordance with an embodiment.

FIG. 29 shows an example of P1 in which symbols P1a and P1b have each been subdivided into two parts in accordance with an embodiment. Assuming that the allowed carrier positions are taken from a raster of every second (e.g., even carrier numbers for P1a and odd numbers for P1b) the useful part of the symbols include two identical parts (i.e. P1a1 and P1a2 and correspondingly P2a1 and P2a2). The receiver could now take correlations mixing parts of P1a and P1b (see FIG. 30). For the correlation purposes, the operations which span over the time interval covered by the total length of P1 the following arrangements may be made: samples belonging to the first period including guard interval GI1 and P1a1 (for the third example, this would mean 64+512=576 samples) will remain as they are; samples belonging to the second period (P1a2) will be frequency translated, i.e., each sample is multiplied by $\exp(j2\pi 1/N)$ where N is the FFT size (1024 in this example) and i is the index of the sample (576 ... 1087), this will make the desired frequency shift by one carrier interval.

Samples belonging to the first part of the second pulse including guard interval GI2 and P1b1 are translated in frequency to the opposite direction by multiplying these samples by $\exp(-j2\pi 1/N)$, where i runs from 0 to 575. Samples belonging to P1b2 remain as they are.

The correlation is now formed by multiplying the modified samples corresponding to the part P1a with the complex conjugate of the modified samples corresponding to part P1b.

The pair-wise multiplication results are summed together and the correlation result is achieved. The result will be maximized when the calculation period (in this example 2174 samples long) falls on the received P1.

Figure 30:
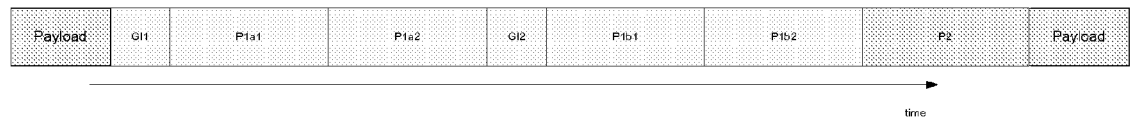
FIG. 30 is a schematic diagram of a correlator portion of a receiver in accordance with an embodiment.
Figure 30:
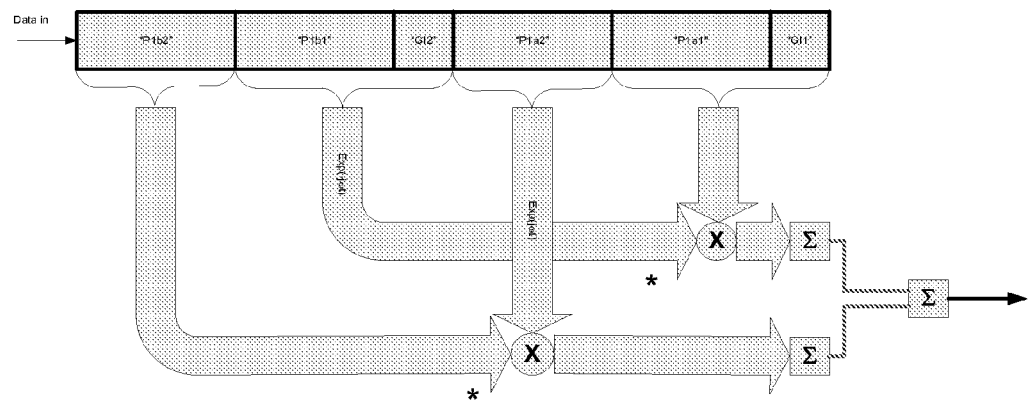

FIG. 30 is a schematic diagram of a correlator portion of a receiver in accordance with an embodiment. The blocks labeled GI1-P1b2 represent the received P1 symbol of the OFDM signal frame. The data is fed into a buffer memory and pair-wise multiplications and summations take place at each incoming sample time. The *'s in FIG. 30 represent complex conjugate. The expressions 'Exp(jωt)' and 'Exp(-jωt)' mean translation in frequency up and down, respectively.

Figure 31:
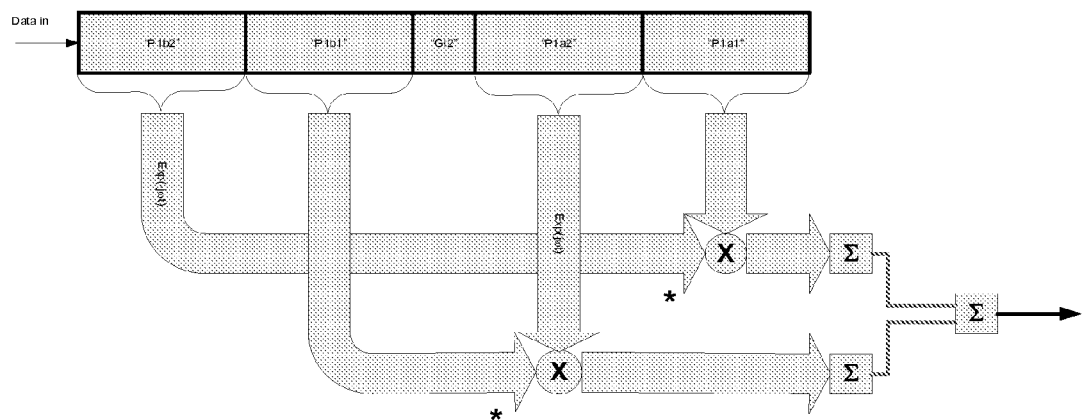
FIG. 31 is a schematic diagram of a correlator portion of a receiver in accordance with an embodiment.

FIG. 31 is a schematic diagram of a correlator portion of a receiver in accordance with an embodiment. This arrangement leads to a narrow correlation peak. The pairwise correlation parts are different than those in the embodiment of FIG. 30. But the working principle and operations are roughly the same. Guard intervals are not used in correlation in the arrangement of FIG. 31. Again, the expressions 'Exp(jωt)' and 'Exp(-jωt)' mean translation in frequency up and down, respectively.

In the arrangement of FIG. 31, the guard intervals are not used in correlation, which makes the buffer memory slightly shorter. Significantly, the symbol parts that are pair-wise correlated are, on one hand, P1a1 vs. P1b2 and, on the other hand, P1a2 vs. P1b1. It can be shown that this will lead to a narrower correlation peak than the arrangement of FIG. 30. The drawback to the embodiment of FIG. 31 is that the energy of guard intervals is not used. So it would be beneficial to make GIs significantly shorter than the symbol length, or even use zero GIs.

The embodiments of FIGS. 30 and 31 produce the following results: the modifications (translations) in P1a and P1b are symmetrical (frequency shifts up and down), which might help in cancelling small identical errors in processing; the modifications take place at (about) half of the symbol length interval, which helps to "scramble" possible continuous wave (CW), multipath, and other interference in correlation; whole pulse energy is utilized—also the guard interval in the embodiment of FIG. 30; and the correlation peak will be fairly narrow (only about half of the width if P1a and P1b would be correlated in the way where frequency translation takes place in P1b (or P1a) only).

Figure 32:
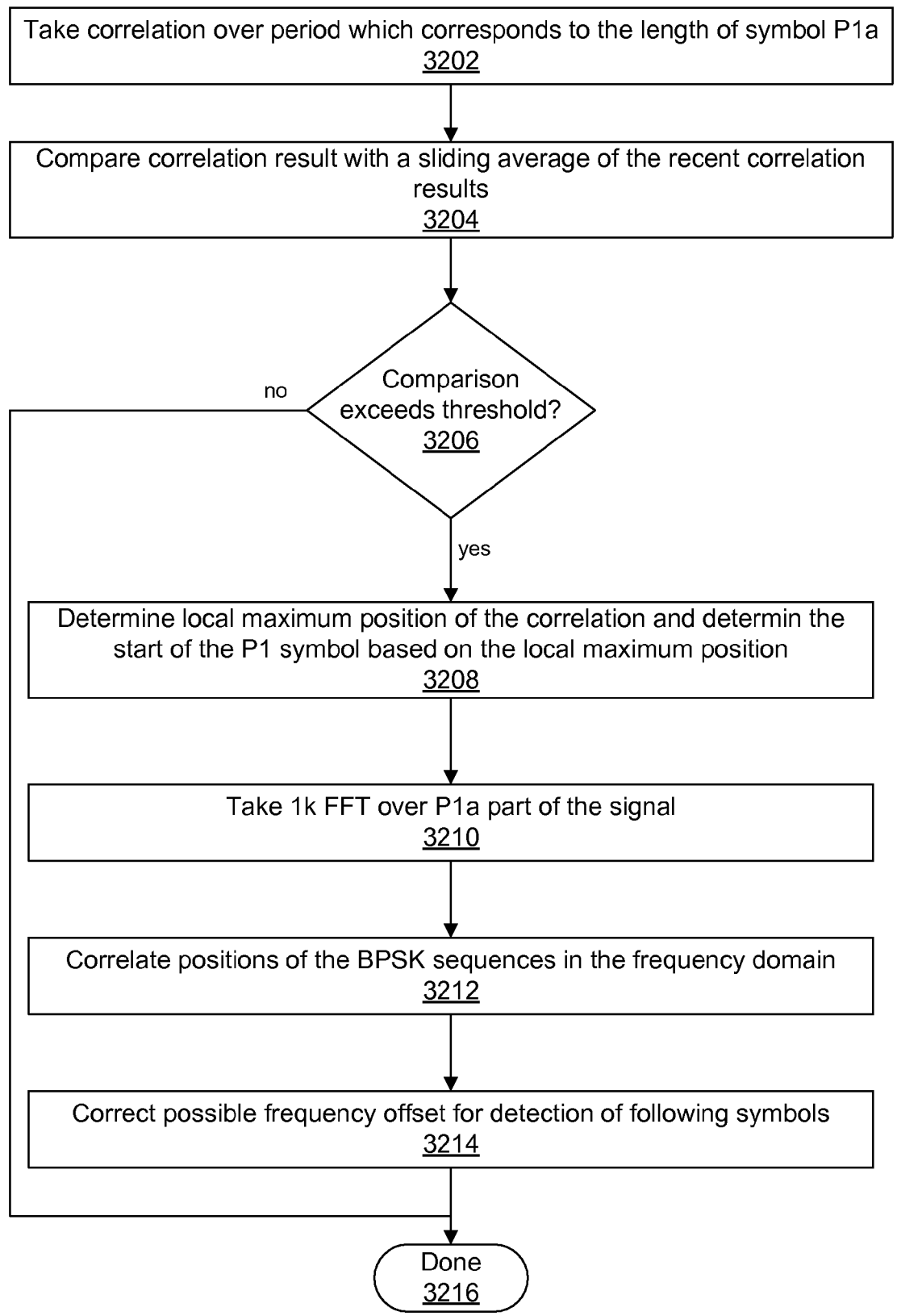
FIG. 32 shows steps of a detection sequence in accordance with an embodiment.

FIG. 32 shows steps of a detection sequence in accordance with an embodiment. FIG. 32 is presented in the context of processing a signal according to the third example set forth above.

A correlation is taken over a period that corresponds to the length of symbol P1a, as shown at 3202. The samples which are taken with delay of Ts (=length of P1a) are corrected by multiplying them with a complex coefficient exp(-jωt) where ω is the frequency difference between the OFDM symbol carriers (=1/Tu).

The correlation result above is compared against a sliding average of the recent correlation results, as shown at 3204.

When the comparison result above exceeds a set threshold value, a decision is made that P1 is present, and the "yes" branch from 3206 is followed. Otherwise, processing for the correlation period is done, as shown at 3216.

The receiver determines a local maximum position of the correlation and determines the start of the P1 symbol based on the local maximum position, as shown at 3208.

The receiver takes 1k FFT over the P1 a part of the signal, as shown at 3210.

The receiver correlates various positions of BPSK sequences in the frequency domain, as shown at 3212. The correlation maximum gives the position of the frequency grid in the FFT domain that can used to solve the difference between the receiver carrier frequency and the nominal frequency (carrier offset). The sequence that maximizes the correlation indicates the FFT size of the actual data symbols.

Possible frequency offset is corrected for the detection of the following symbols, as shown at 3214, and processing for the correlation period is then done, as shown at 3214.

In accordance with embodiments, tolerance against multipath fading is increased as it would be highly improbable that both parts, P1a and P1b would be cancelled at the same time. When detection in the receiver is based on correlation results using both P1a and P1b, at least one result will be significantly higher than just correlating with noise or random data.

In addition, due to the periodicity of P1 caused by the sparse use of carrier positions, the receiver may base its decision regarding the existence of a P1 signal on correlations over the periodic parts of the signals. This periodicity increases the used signal power (as practically whole signal energy can be used in detection) and also increases the variety (diversity) as different parts of the signal in time domain can be used giving a variety of correlation results. These correlation results differ in interference (or unwanted signals) content and can be used to make more reliable decisions.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), application specific integrated circuits (ASIC), and the like.

Embodiments include any novel feature or combination of features disclosed herein either explicitly or any generalization thereof. While embodiments have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A method comprising:
   transmitting a first orthogonal frequency division multiplexing pilot symbol having a fast Fourier transform size and a plurality of carrier frequencies that includes a first plurality of allowed carrier frequencies and a first plurality of forbidden carrier frequencies, wherein the first plurality of allowed carrier frequencies includes a first plurality of active carrier frequencies; and
   transmitting a second orthogonal frequency division multiplexing pilot symbol having the fast Fourier transform size and the plurality of carrier frequencies, wherein the plurality of carrier frequencies includes a second plurality of allowed carrier frequencies and a second plurality of forbidden carrier frequencies, wherein the second plurality of allowed carrier frequencies includes a second plurality of active carrier frequencies, wherein the second plurality of allowed carrier frequencies is shifted by a predetermined frequency relative to the first plurality of allowed carrier frequencies, the second plurality of forbidden carrier frequencies is shifted by the predetermined frequency relative to the first plurality of forbidden carrier frequencies, and the second plurality of active carrier frequencies is shifted by the predetermined frequency relative to the first plurality of active carrier frequencies.

2. The method of claim 1, wherein the predetermined frequency is a multiple of frequency difference between adjacent carrier frequencies.

3. The method of claim 1, wherein the fast Fourier transform size is 1024 samples.

4. The method of claim 3, wherein the first and second orthogonal frequency division multiplexing pilot symbols have a guard interval duration that is a fraction of a duration of a useful symbol period.

5. The method of claim 1, wherein the first and second orthogonal frequency division multiplexing pilot symbols have no guard interval.

6. The method of claim 1, wherein the first plurality of allowed carrier frequencies occupy carrier locations that are either even numbered locations or odd numbered locations and, if the first plurality of allowed carrier frequencies occupy even numbered locations, then the first plurality of forbidden carrier frequencies occupy odd numbered locations, and, if the first plurality of allowed carrier frequencies occupy odd numbered locations, then the first plurality of forbidden carrier frequencies occupy even numbered locations.

7. The method of claim 6, wherein if the first plurality of allowed carrier frequencies occupy even numbered locations, then the second plurality of allowed carrier frequencies occupy odd numbered locations, and, if the first plurality of allowed carrier frequencies occupy odd numbered locations, then the second plurality of allowed carrier frequencies occupy even numbered locations.

8. The method of claim 7, wherein if the second plurality of allowed carrier frequencies occupy even numbered locations, then the second plurality of forbidden carrier frequencies occupy odd numbered locations, and, if the second plurality of allowed carrier frequencies occupy odd numbered locations, then the second plurality of forbidden carrier frequencies occupy even numbered locations.

9. Apparatus comprising a processor and a memory containing executable instructions that, when executed by the processor, perform:
transmitting a first orthogonal frequency division multiplexing pilot symbol having a fast Fourier transform size and a plurality of carrier frequencies that includes a first plurality of allowed carrier frequencies and a first plurality of forbidden carrier frequencies, wherein the first plurality of allowed carrier frequencies includes a first plurality of active carrier frequencies; and
transmitting a second orthogonal frequency division multiplexing pilot symbol having the fast Fourier transform size and the plurality of carrier frequencies, wherein the plurality of carrier frequencies includes a second plurality of allowed carrier frequencies and a second plurality of forbidden carrier frequencies, wherein the second plurality of allowed carrier frequencies includes a second plurality of active carrier frequencies, wherein the second plurality of allowed carrier frequencies is shifted by a predetermined frequency relative to the first plurality of allowed carrier frequencies, the second plurality of forbidden carrier frequencies is shifted by the predetermined frequency relative to the first plurality of forbidden carrier frequencies, and the second plurality of active carrier frequencies is shifted by the predetermined frequency relative to the first plurality of active carrier frequencies.

10. The apparatus of claim 9, wherein the predetermined frequency is a multiple of frequency difference between adjacent carrier frequencies.

11. The apparatus of claim 9, wherein the fast Fourier transform size is 1024 samples.

12. The apparatus of claim 11, wherein the first and second orthogonal frequency division multiplexing pilot symbols have a guard interval duration that is a fraction of a duration of a useful symbol period.

13. The apparatus of claim 9, wherein the first plurality of allowed carrier frequencies occupy carrier locations that are either even numbered locations or odd numbered locations and, if the first plurality of allowed carrier frequencies occupy even numbered locations, then the first plurality of forbidden carrier frequencies occupy odd numbered locations, and, if the first plurality of allowed carrier frequencies occupy odd numbered locations, then the first plurality of forbidden carrier frequencies occupy even numbered locations.

14. The apparatus of claim 13, wherein if the first plurality of allowed carrier frequencies occupy even numbered locations, then the second plurality of allowed carrier frequencies occupy odd numbered locations, and, if the first plurality of allowed carrier frequencies occupy odd numbered locations, then the second plurality of allowed carrier frequencies occupy even numbered locations.

15. The apparatus of claim 14, wherein if the second plurality of allowed carrier frequencies occupy even numbered locations, then the second plurality of forbidden carrier frequencies occupy odd numbered locations, and, if the second plurality of allowed carrier frequencies occupy odd numbered locations, then the second plurality of forbidden carrier frequencies occupy even numbered locations.

16. A computer readable medium storing executable instructions that, when executed, cause a processor to perform a method comprising:
transmitting a first orthogonal frequency division multiplexing pilot symbol having a fast Fourier transform size and a plurality of carrier frequencies that includes a first plurality of allowed carrier frequencies and a first plurality of forbidden carrier frequencies, wherein the first plurality of allowed carrier frequencies includes a first plurality of active carrier frequencies; and
transmitting a second orthogonal frequency division multiplexing pilot symbol having the fast Fourier transform size and the plurality of carrier frequencies, wherein the plurality of carrier frequencies includes a second plurality of allowed carrier frequencies and a second plurality of forbidden carrier frequencies, wherein the second plurality of allowed carrier frequencies includes a second plurality of active carrier frequencies, wherein the second plurality of allowed carrier frequencies is shifted by a predetermined frequency relative to the first plurality of allowed carrier frequencies, the second plurality of forbidden carrier frequencies is shifted by the predetermined frequency relative to the first plurality of forbidden carrier frequencies, and the second plurality of active carrier frequencies is shifted by the predetermined frequency relative to the first plurality of active carrier frequencies.

17. The computer readable medium of claim 16, wherein the predetermined frequency is a multiple of frequency difference between adjacent carrier frequencies.

18. The computer readable medium of claim 16, wherein the fast Fourier transform size is 1024 samples.

19. The computer readable medium of claim 18, wherein the first and second orthogonal frequency division multiplexing pilot symbols have a guard interval duration that is a fraction of a duration of a useful symbol period.

20. The computer readable medium of claim 16, wherein the first and second orthogonal frequency division multiplexing pilot symbols have no guard interval.

21. The computer readable medium of claim 16, wherein the first plurality of allowed carrier frequencies occupy carrier locations that are either even numbered locations or odd numbered locations and, if the first plurality of allowed carrier frequencies occupy even numbered locations, then the first plurality of forbidden carrier frequencies occupy odd numbered locations, and, if the first plurality of allowed carrier frequencies occupy odd numbered locations, then the first plurality of forbidden carrier frequencies occupy even numbered locations.

22. The computer readable medium of claim 21, wherein if the first plurality of allowed carrier frequencies occupy even numbered locations, then the second plurality of allowed carrier frequencies occupy odd numbered locations, and, if the first plurality of allowed carrier frequencies occupy odd numbered locations, then the second plurality of allowed carrier frequencies occupy even numbered locations.

23. The computer readable medium of claim 22, wherein if the second plurality of allowed carrier frequencies occupy even numbered locations, then the second plurality of forbidden carrier frequencies occupy odd numbered locations, and, if the second plurality of allowed carrier frequencies occupy odd numbered locations, then the second plurality of forbidden carrier frequencies occupy even numbered locations.

* * * * *